United States Patent

(12) United States Patent
Nakanishi et al.

(10) Patent No.: US 12,708,997 B2
(45) Date of Patent: Aug. 18, 2026

(54) INFORMATION PROCESSING APPARATUS FOR ROBOT TEACHING, AND ROBOT SYSTEM FOR ROBOT TEACHING

(71) Applicants: LAUREL BANK MACHINES CO., LTD., Tokyo (JP); LAUREL MACHINERY CO., LTD., Osaka (JP); LAUREL PRECISION MACHINES CO., LTD., Osaka (JP)

(72) Inventors: Hideyuki Nakanishi, Tokyo (JP); Tomohide Handa, Tokyo (JP); Hiroyuki Kojima, Tokyo (JP); Yoshikazu Yamagata, Tokyo (JP)

(73) Assignees: LAUREL BANK MACHINES CO., LTD., Tokyo (JP); LAUREL PRECISION CO., LTD., Osaka (JP)

( * ) Notice: Subject to any disclaimer, the term of this patent is extended or adjusted under 35 U.S.C. 154(b) by 120 days.

(21) Appl. No.: 18/646,984

(22) Filed: Apr. 26, 2024

(65) Prior Publication Data

US 2024/0269826 A1 Aug. 15, 2024

Related U.S. Application Data

(63) Continuation of application No. PCT/JP2022/040122, filed on Oct. 27, 2022.

(30) Foreign Application Priority Data

Nov. 2, 2021 (JP) ................................ 2021-179354

(51) Int. Cl.
*G05B 19/423* (2006.01)
*B25J 9/00* (2006.01)
(Continued)

(52) U.S. Cl.
CPC ........... *B25J 9/0081* (2013.01); *B25J 9/1664* (2013.01); *B25J 9/1692* (2013.01); *B25J 13/089* (2013.01)

(58) Field of Classification Search
CPC ...... B25J 9/0081; B25J 9/1664; B25J 9/1692; B25J 13/089; G05B 19/39449; G05B 19/423; G05B 19/427
See application file for complete search history.

(56) References Cited

U.S. PATENT DOCUMENTS 9,056,396 B1 * 6/2015 Linnell .................. B25J 9/1664
2016/0207198 A1 * 7/2016 Willför .................. B25J 9/1676
(Continued)

FOREIGN PATENT DOCUMENTS

JP 2017-104944 A 6/2017
JP 2020-131314 A 8/2020
JP 2021-024025 A 2/2021

OTHER PUBLICATIONS

International Search Report for PCT/JP2022/040122 dated Jan. 17, 2023.

*Primary Examiner* — Dalena Tran
(74) *Attorney, Agent, or Firm* — Sughrue Mion, PLLC

(57) ABSTRACT

A robot controller acquires positions and orientations of a terminal apparatus in a physical space. The robot controller generates trajectory information indicating a trajectory of an end effector of the robot, the end effector moving to the same positions in the physical space at which the terminal apparatus was positioned, by defining positions and orientations of the end effector based on the acquired positions and orientations of the terminal apparatus.

10 Claims, 10 Drawing Sheets

(51) Int. Cl.

| | |
|---|---|
| ***B25J 9/16*** | (2006.01) |
| ***B25J 13/08*** | (2006.01) |

(56) References Cited

U.S. PATENT DOCUMENTS

| | | | | |
|---|---|---|---|---|
| 2017/0165841 | A1 | 6/2017 | Kamoi | |
| 2020/0353619 | A1 | 11/2020 | Sato et al. | |
| 2022/0265362 | A1* | 8/2022 | Marti | A61B 90/96 |
| 2022/0266449 | A1 | 8/2022 | Hasegawa et al. | |
| 2025/0001588 | A1* | 1/2025 | Vanzella | B25J 19/023 |

* cited by examiner

FIG. 7

MTBL

| ACTION ID | MOVEMENT INFORMATION | | | |
|---|---|---|---|---|
| | POSITION NUMBER | POSITION | ORIENTATION | ACTION |
| m001 | 1 | Pa (PINFa) | Aa (AINFa) | START OF APPLICATION OF A PIGMENT TO AN OBJECT |
| | 2 | Pb (PINFb) | Ab (AINFb) | APPLICATION OF THE PIGMENT TO THE OBJECT |
| | 3 | Pc (PINFc) | Ac (AINFc) | END OF APPLICATION OF THE PIGMENT TO THE OBJECT |
| m002 | 1 | Pj (PINFj) | Aj (AINFj) | START OF POLSHING AN OBJECT |
| | ⋮ | ⋮ | ⋮ | ⋮ |
| ⋮ | ⋮ | ⋮ | ⋮ | ⋮ |

INFORMATION PROCESSING APPARATUS FOR ROBOT TEACHING, AND ROBOT SYSTEM FOR ROBOT TEACHING

CROSS REFERENCE TO RELATED APPLICATIONS

This application is a Continuation Application of PCT Application No. PCT/JP2022/040122 filed on Oct. 27, 2022, and is based on and claims priority from Japanese Patent Application No. 2021-179354 filed on Nov. 2, 2021, the entire contents of each of which are incorporated by reference herein.

BACKGROUND

Field of the Invention

This disclosure relates to information processing apparatuses for robot teaching, robot systems for robot teaching, methods for generating trajectories of a specific part of a robot, methods for controlling robots in robot teaching, recording media, and movable objects.

Description of Related Art

A known direct robot teaching is one of methods for teaching a robot (e.g., an industrial robot) actions (e.g., Japanese Patent Application Laid-Open Publication No. 2020-131314). In one example of the direct robot teaching, a human operator directly manipulates the robot to provide the robot with operating points.

SUMMARY

The direct robot teaching remains a challenge in that it increases physical and temporal burdens on the operator, depending on weight and size of the robot.

(Aspect 1) An information processing apparatus according to one aspect of this disclosure is an information processing apparatus for robot teaching by using a movable object being moved independently in time from a robot. The information processing apparatus includes at least one memory configured to store a program and at least one processor. The at least one processor is configured to execute the program to at least (i) based on the movable object being sequentially moved from one position to another among positions in a physical space, acquire the following (a) or (b): (a) the positions of the movable object in the physical space, or (b) the positions, and orientations of the movable object at the respective positions in the physical space, and (ii) generate trajectory information indicating a trajectory of a specific part of the robot, the specific part moving to the same or substantially the same positions in the physical space at which the movable object was positioned, by sequentially defining positions and orientations of the specific part of the robot based on the following (a) or (b): (a) the acquired positions of the movable object, or (b) the acquired positions and orientations of the movable object.

(Aspect 4) A robot system for robot teaching, according to one aspect of this disclosure includes (i) a robot, (ii) a movable object that is sequentially movable from one position to another among positions in a physical space and that is movable independently in time from the robot, (iii) a detector configured to detect the positions of the movable object in the physical space, and (iv) an information processing apparatus. The movable object includes (i) an inertial sensor configured to detect orientations of the movable object at the respective positions in the physical space, and (ii) a communicator configured to communicate with at least the information processing apparatus. The detector includes a communicator configured to communicate with the information processing apparatus. The information processing apparatus includes at least one memory configured to store a program, and at least one processor. The at least one processor is configured to execute the program to at least: (i) acquire from the detector, the detected positions of the movable object, (ii) acquire from the inertial sensor, the detected orientations of the movable object, (iii) generate trajectory information indicating a trajectory of a specific part of the robot, the specific part moving to the same or substantially the same positions in the physical space at which the movable object was positioned, by sequentially defining a plurality of positions and orientations of the specific part of the robot based on the acquired positions and orientations of the movable object, and (iv) control the robot based on the trajectory information.

(Aspect 5) A robot system for robot teaching, according to one aspect of this disclosure includes (i) a robot, (ii) a movable object that is sequentially movable from one position to another among positions in a physical space and that is movable independently in from the robot, and (iii) an information processing apparatus. The movable object includes (i) an inertial sensor configured to detect (ia) the positions of the movable object in the physical space, or (ib) the positions, and orientations of the movable object at the respective positions in the physical space, and (ii) a communicator configured to communicate with the information processing apparatus. The information processing apparatus includes at least one memory configured to store a program, and at least one processor. The at least one processor is configured to execute the program to at least (i) acquire from inertial sensor, (ia) the detected positions of the movable object, or (ib) the detected positions, and the detected positions and orientations of the movable object, (ii) generate trajectory information indicating a trajectory of a specific part of the robot, the specific part moving to the same or substantially the same positions in the physical space at which the movable object was positioned, by sequentially defining positions and orientations of the specific part of the robot based on (iia) the acquired positions of the movable object, or (iib) the acquired positions and orientations of the movable object, and (iii) control the robot based on the trajectory information.

(Aspect 6) A robot system for robot teaching, according to one aspect of this disclosure includes (i) a robot, (ii) a movable object that is sequentially movable from one position to another among positions in a physical space and that is movable independently in time from the robot, and (iii) a detector configured to detect (ia) the positions of the movable object in the physical space, or (ib) the positions, and orientations of the movable object at the respective positions in the physical space, and (iv) an information processing apparatus. The detector includes a communicator configured to communicate with the information processing apparatus. The information processing apparatus includes at least one memory configured to store a program, and at least one processor. The at least one processor is configured to execute the program to at least (i) acquire from the detector, (ia) the detected positions of the movable object, or (ib) the detected positions and orientations of the movable object, (ii) generate trajectory information indicating a trajectory of a specific part of the robot, the specific part moving to the same or substantially the same positions in the physical space at which the movable object was positioned, by (iia) sequentially defining positions of the specific part of the robot based on the acquired positions of the movable object, or (iib) sequentially defining positions and orientations of the specific part of the robot based on the acquired positions and orientations of the movable object, and (iii) control the robot based on the trajectory information.

(Aspect 7) A robot system for robot teaching, according to one aspect of this disclosure includes (i) a robot, (ii) a movable object that is sequentially movable from one position to another among positions in a physical space and that is movable independently in time from the robot, and (iii) an information processing apparatus. The movable object includes (i) an inertial sensor configured to detect orientations of the movable object at the respective positions in the physical space, (ii) an image capture device configured to (iia) capture an image of a marking disposed at a position with a known relative relationship between the marking and a predetermined position within the robot, and (iib) detect, based on a relative position of the robot relative to the image capture device, positions of the movable object in the physical space, and (iii) a communicator configured to communicate with at least the information processing apparatus. The information processing apparatus includes at least one memory configured to store a program, and at least one processor. The at least one processor is configured to execute the program to at least (i) acquire from the movable object, the detected positions and orientations of the movable object, (ii) generate trajectory information indicating a trajectory of a specific part of the robot, the specific part moving to the same or substantially the same positions in the physical space at which the movable object was positioned, by sequentially defining positions and orientations of the specific part of the robot based on the acquired positions and orientations of the movable object, and (iii) control the robot based on the trajectory information.

(Aspect 11) An method according to one aspect of this disclosure is a computer-implemented method for generating trajectory information indicative of a trajectory of a specific part of a robot in robot teaching by using a movable object. The method includes the following (i) and (ii): (i) based on the movable object being sequentially moved from one position to another among positions in a physical space and being moved independently in time from the robot, acquiring (ia) the positions of the movable object in the physical space, or (ib) the positions, and orientations of the movable object at the respective positions in the physical space, and (ii) generating trajectory information indicating a trajectory of the specific part of the robot, the specific part moving to the same or substantially the same positions in the physical space at which the movable object was positioned, by sequentially defining positions and orientations of the specific part of the robot based on (iia) the acquired positions of the movable object, or (iib) the acquired positions and orientations of the movable object.

(Aspect 15) A recording medium according to one aspect of this disclosure is a non-transitory computer readable recording medium storing a robot teaching program executable by at least one processor to execute a method including the following (i) and (ii): (i) based on a movable object being sequentially moved from one position to another among positions in a physical space and being moved independently in time from a robot, acquiring (ia) positions of movable object in the physical space, or (ib) the positions, and orientations of the movable object at the plurality of respective positions in the physical space, and (ii) generating trajectory information indicating a trajectory of a specific part of the robot, the specific part moving to the same or substantially the same positions in the physical space at which the movable object was positioned, by sequentially defining positions and orientations of the specific part of the robot based on (iia) the acquired positions of the movable object, or (iib) the acquired positions and orientations of the movable object.

(Aspect 16) A movable object according to one aspect of this disclosure is a movable object that is used for robot teaching and that is moved independently in time from a robot. The movable object includes the following (i) and (ii): (i) an inertial sensor configured to, based on the movable object being sequentially moved from one position to another among positions in a physical space, detect (ia) positions of the movable object in the physical space, or (ib) the positions, and orientations of the movable object at the respective positions in the physical space, and (ii) a communicator configured to communicate with an information processing apparatus configured to generate trajectory information indicating a trajectory of a specific part of the robot, the specific part moving to the same or substantially the same positions in the physical space at which the movable object was positioned, and control the robot. The communicator is further configured to transmit to the information processing apparatus, the detected positions of the movable object, or the detected positions and orientations of the movable object.

According to this disclosure, an additional burden on a human operator can be suppressed in teaching the robot actions.

BRIEF DESCRIPTION OF THE DRAWINGS

FIG. 7 is an explanatory diagram of a movement table shown in FIG. 2.

DESCRIPTION OF THE EMBODIMENT

Figure 1:
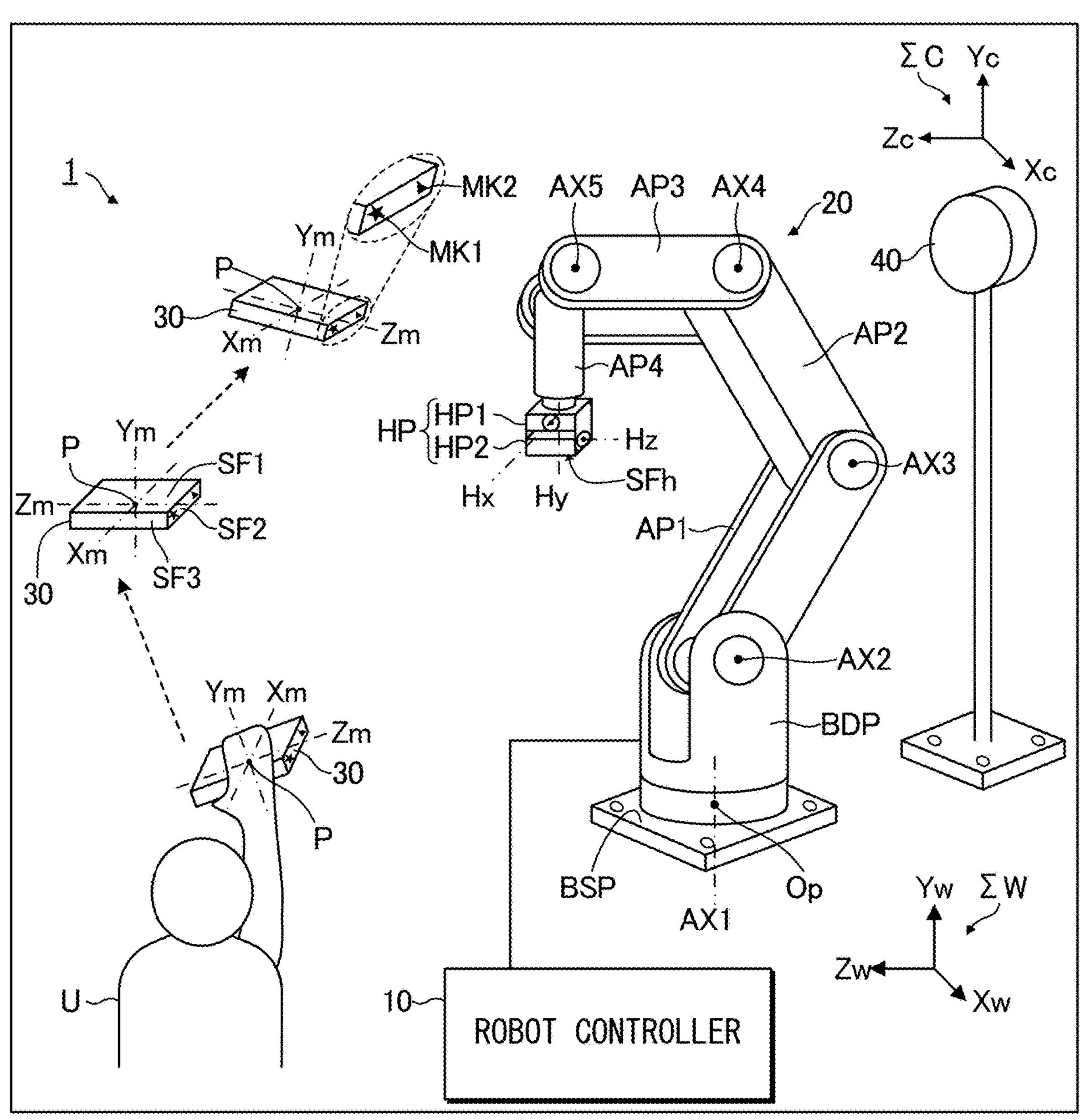
FIG. 1 is an explanatory diagram for an outline of a robot system according to an embodiment.

An embodiment of this disclosure will now be described below with reference to the drawings. In the drawings, the dimensions and scales of each element are appropriately different from actual ones. The embodiment described below includes preferable specific examples of this disclosure. Accordingly, various technically preferable limitations are applied. However, the scope of this disclosure is not limited to such an embodiment unless there is a specific description limiting this disclosure.

1. Embodiment

First, an example will now be described of an outline of a robot system 1 according to the embodiment with reference to FIG. 1.

FIG. 1 is an explanatory diagram for an outline of the robot system 1 according to the embodiment.

For convenience of description, two coordinate systems are introduced, one of which is a world coordinate system ΣW fixed to a physical space, and the other of which is a camera coordinate system ΣC fixed to an image capture device 40 (e.g., a camera). The image capture device 40 is an example of a "detector."

In one example, the world coordinate system ΣW includes an origin at a predetermined position in the physical space. The world coordinate system ΣW is a three-axis orthogonal coordinate system with an Xw axis, a Yw axis and a Zw axis, which are perpendicular to one another. In the embodiment, it is envisaged that the predetermined position (i.e., the origin of the world coordinate system ΣW) is a position Op. In one example, the position Op is at the center of a base BSP of a robot 20 (described below). In the embodiment, it is envisaged that an Xw-Zw plane is parallel to a floor to which the base BSP is fixed.

In one example, the camera coordinate system ΣC includes an origin located at the image capture device 40. The camera coordinate system ΣC is a three-axis orthogonal coordinate system with an Xc axis, a Yc axis and a Zc axis, which are perpendicular to one another. In the embodiment, it is envisaged that the axis Zc is parallel to an optical axis of an optical system included in the image capture device 40 (hereafter, the optical axis of the image capture device 40).

The robot system 1 shown in FIG. 1 is a system for controlling actions of the robot 20. In one example, the robot system 1 includes a robot controller 10, a robot 20, a terminal apparatus 30 and an image capture device 40. The robot controller 10 is an example of an "information processing apparatus." The terminal apparatus 30 is an example of a "movable object."

In one example, the robot controller 10 and the robot 20 shown in FIG. 1 are communicatively connected with each other. A wired connection, a wireless connection, or both may be used for a connection between the robot controller 10 and the robot 20.

The robot controller 10, the terminal apparatus 30 and the image capture device 40 each include a communication device, and these are communicatively connected to each other. In the embodiment, it is envisaged that communication among the robot controller 10, the terminal apparatus 30 and the image capture device 40 is carried out by a short-range radio communication, such as Bluetooth (registered trademark) or Wi-Fi (registered trademark). Elements included in the robot system 1 are communicable with each other and are connected via a wired network, or wireless network, or both.

The robot controller 10 may be a freely selected information processing apparatus communicable with other apparatuses. In one example, the robot controller 10 controls actions (physical movements) of the robot 20. A configuration of the robot controller 10 will be described later (see FIGS. 2 and 3).

In one example, the robot 20 is an articulated robot to be installed at a factory. In one example, the robot 20 includes a base BSP, a body BDP, arms AP (AP1, AP2, AP3, and AP4), and an end effector HP. The end effector HP is an example of a "specific part."

The base BSP is fixed at a predetermined location, such as a floor. The body BDP is rotatably connected to the base BSP around a rotational axis AX1. The arm AP1 is rotatably connected to the body BDP around a rotatable axis AX2. The arm AP2 is rotatably connected to the arm AP1 around a rotational axis AX3. The arm AP3 is rotatably connected to the arm AP2 around a rotational axis AX4. The arm AP4 is rotatably connected to the arm AP3 around the rotational axis AX5. However, a rotational angle of each of the arms AP1, AP2, AP3, and AP4 is limited to less than 360 degrees.

The end effector HP includes a first end part HP1, and a second end part HP2 connected to the first end part HP1. The first end part HP1 is rotatably connected to the arm AP4 around a rotational axis Hy. The first end part HP1 is also rotatable around a rotational axis Hx. The second end part HP2 is rotatably connected to the first end part HP1 around a rotational axis Hz. However, when the first end part HP1 rotates around the rotational axis Hx, a rotational angle of the first end part HP1 is limited to less than 360 degrees. Similarly, when the second end part HP2 rotates around the rotational axis Hz, a rotational angle of the second end part HP2 is limited to less than 360 degrees.

The second end part HP2 rotates together with the first end part HP1 when the first end part HP1 rotates around the rotational axis Hy or Hx. This is because the second end part HP2 is connected to the first end part HP1. Thus, the second end part HP2 is rotatable around the rotational axes Hx, Hy and Hz.

In the embodiment, it is envisaged the robot 20 is fixed to a predetermined position of the floor. However, the robot 20 may be movable on the floor (may not be fixed to the same position). In this case, an origin of the robot 20 (e.g., the center of gravity of the robot 20, or the center thereof) is interpreted as a "specific part."

A portable electronic device (e.g., a portable information processing device that transmits signals) may be employed as the terminal apparatus 30. In one example, the terminal apparatus 30 may be a portable remote controller or a smartphone. In one example, the terminal apparatus 30 is held by a human operator U to define a position and orientation of the end effector HP of the robot 20 that will implement an action (e.g., application of a pigment to an object). The terminal apparatus 30 is moved by the operator U independently in time from the robot 20 along a trajectory (trajectory information indicating a movement path) of positions in the physical space to which the end effector HP will be actually moved. Specifically, independently in time from the robot, the terminal apparatus 30 is sequentially moved from one position to another from two or more positions in the physical space. The human operator U is an example of a "user." In one example, one position of the end effector HP corresponds to one operating point of the robot 20. Thus, the operator U moves the terminal apparatus 30 along the trajectory of the positions to which the end effector HP will be actually moved in order to teach the robot 20 actual positions to which the end effector HP to be moved. As a result, in an actual action (task) of the robot 20, the end effector HP will move to the same or substantially the same positions to which the terminal apparatus 30 was positioned.

The terminal apparatus 30 is moved by the operator U, which can reduce a physical and temporal burden on the operator U, as compared with a direct manipulation of the robot 20. In the embodiment, additional physical and time burdens on the operator U can be reduced in teaching the trajectory to the robot 20, as compared with the direct manipulation of the robot 20.

In the embodiment, a rectangular terminal apparatus 30 is envisaged for clarity of description of an orientation of the terminal apparatus 30. An orientation of the terminal apparatus 30 will be described using an Xm axis, a Ym axis and a Zm axis, which are perpendicular to one another. Specifically, the Xm axis passes through a position P of the terminal apparatus 30 and is perpendicular to a surface SF3 thereof. The Ym axis passes through the position P and is perpendicular to a surface SF1 of the terminal apparatus 30. The Zm axis passes through the position P and is perpendicular to a surface SF2 of the terminal apparatus 30. In one example, the position P is at the center of the surface SF1 of the terminal apparatus 30. The terminal apparatus 30 is not limited to be rectangular.

In one example, a position of the terminal apparatus 30 is described by coordinates of the position P thereof. An orientation of the terminal apparatus 30 is described by the following (i), (ii) and (iii): (i) a rotational angle of the terminal apparatus 30 around the Xm axis; (ii) a rotational angle of the terminal apparatus 30 around the Ym axis; and (iii) a rotational angle of the terminal apparatus 30 around the Zm axis. In the embodiment, it is envisaged that the rotational angles of the terminal apparatus 30 are described by an orientation of the terminal apparatus 30 as a reference (0 degrees) when the Xm, Ym and Zm axes are parallel to the Xw, Yw and Zw axes, respectively.

In one example, a position of the end effector HP of the robot 20 is described by coordinates of the center of a surface SFh of the second end part HP2 (hereafter, a surface SFh of the end effector HP). An orientation of the end effector HP is described by the following (i), (ii) and (iii): (i) a rotational angle of the end effector HP around the rotational axis Hx; (ii) a rotational angle of the end effector HP around the rotational axis Hy; and (iii) a rotational angle of the end effector HP around the rotational axis Hz. In the embodiment, it is envisaged that the rotational angles of the end effector HP are described by an orientation of the end effector HP as a reference (0 degrees) when the rotational axes Hx, Hy and Hz are parallel to the Xw, Yw and Zw axes, respectively.

In the embodiment, it is envisaged that a position of the terminal apparatus 30 is calculated by the image capture device 40, and an orientation thereof is calculated by the terminal apparatus 30. In one example, the terminal apparatus 30 includes an inertial sensor 38 that detects an orientation of the terminal apparatus 30. A configuration of the terminal apparatus 30 will be described later (see FIG. 4). For an easy detection of the terminal apparatus 30 by the image capture device 40, the terminal apparatus 30 shown in FIG. 1 includes two different markings MK (MK1 and MK2) on the surface SF2. Since the markings MK within a captured image of the terminal apparatus 30 are detected by the image capture device 40, it is possible to detect with ease an image of the terminal apparatus 30 within the entire image.

There may be one marking MK. For one marking MK with its known position, the position P (i.e., the center of the terminal apparatus 30) can be calculated using a position within the image of the marking MK and an orientation of the terminal apparatus 30 detected by an inertial sensor 38 (described later). If there are two or more markings MK with their known positions, the position P (the center of the terminal apparatus 30) can be calculated using two markings MK. For a few markings MK, it is preferable that the markings MK be provided on more than one surface of the terminal apparatus 30. This is because the image capture device 40 may fail to capture an image of the markings MK for some reason. The markings MK may be light emitting elements (e.g., LEDs).

The image capture device 40 is a camera that includes optical elements and captures images of a subject. In the embodiment, it is envisaged that the image capture device 40 is a three-dimensional camera that calculates depth (distance between the camera and an object). In one example, the image capture device 40 captures an image of the terminal apparatus 30 to calculate a position of the terminal apparatus 30 in the camera coordinate system EC. The image capture device 40 then converts coordinates of the terminal apparatus 30 in the camera coordinate system EC into those in the world coordinate system ΣW. The image capture device 40 transmits to the robot controller 10, position information indicating the position of the terminal apparatus 30 in the world coordinate system ΣW. In the embodiment, it is envisaged that known parameters, which are used to convert coordinates in the camera coordinate system EC into those in the world coordinate system ΣW, are applied. A coordinate transformation may be executed by the robot controller 10 to convert a position of the terminal apparatus 30 in the camera coordinate system EC into that in the world coordinate system ΣW. A timing of capturing an image by the image capture device 40 is determined based on a signal from the terminal apparatus 30 or the robot controller 10.

Thus, in the embodiment, the image capture device 40 serves as a rangefinder that measures a distance between the terminal apparatus 30 and the image capture device 40. The distance is measured by a known technique, such as ToF (Time of Flight), FMCW (Frequency Modulated Continuous Wave), and a stereo-camera system.

In the ToF, a distance from the rangefinder (e.g., the image capture device 40) to the object is measured based on time from a projection of light (e.g., infrared light) to the object to a receipt of the reflected light from the object by the rangefinder. In the FMCW, the distance from the rangefinder to the object is measured based on a frequency difference between (i) a transmitted signal from the rangefinder and (ii) the reflected signal by the object (a reception signal received by the rangefinder). Examples of the sensor for measuring a distance include ToF type LiDAR (Light Detection and Ranging, or Laser Imaging Detection and Ranging) and FMCW type LiDAR. In the stereo camera system, an image of the same object is captured by two cameras, and the distances from the cameras to the object are measured based on a parallax when the image is captured. Methods for measuring a distance are not limited to such examples.

In one example, the robot controller 10 acquires from the image capture device 40, position information indicating a position of the terminal apparatus 30. Furthermore, the robot controller 10 acquires from the terminal apparatus 30, orientation information indicating an orientation of the terminal apparatus 30. The robot controller 10 then defines a position and orientation of the end effector HP of the robot 20 based on the acquired position information and orientation information. Methods for defining a position and orientation of the end effector HP will be described later (see FIG. 6).

The configuration of the robot system 1 is not limited to the example shown in FIG. 1. In one example, the robot controller 10 may be included in the robot 20. The image capture device 40 may be provided in the robot 20. The robot 20 may be communicatively connected to the terminal apparatus 30 and the image capture device 40. In this case, a wired connection, a wireless connection, or both, are applied to a connection among the terminal apparatus 30, the image capture device 40, and the robot 20.

The image capture device 40 may be a monocular camera if an error in distance between the terminal apparatus 30 and the image capture device 40 falls within an acceptable range. The distance is calculated by the image capture device 40 under the assumption that the Xm axis of the terminal apparatus 30 is perpendicular to the optical axis of the image capture device 40. Specifically, the distance between the terminal apparatus 30 and the image capture device 40 is calculated based on (i) a known distance between the markings MK1 and MK2, and (ii) a position and focal length of each of the markings MK1 and Mk2. The focal length is known and refers to a focal length of the optical system included in the image capture device 40.

In one example, a GPS (Global Positioning System) device may be employed as a detector instead of the image capture device (detector) 40 if the following conditions (i) and (ii) are met: (i) the position of the terminal apparatus 30 is identified by the robot controller 10 based on satellite signals from GPS satellites; and (ii) the accuracy of the position is sufficient for its purpose. Alternatively, other than the GPS device, a device using laser beams or sound waves may be employed as the detector. The laser beams or sound waves may be emitted from the terminal apparatus 30 and may be detected by the camera (detector) 40.

A hardware configuration of the robot controller 10 will now be described with reference to FIG. 2.

Figure 2:
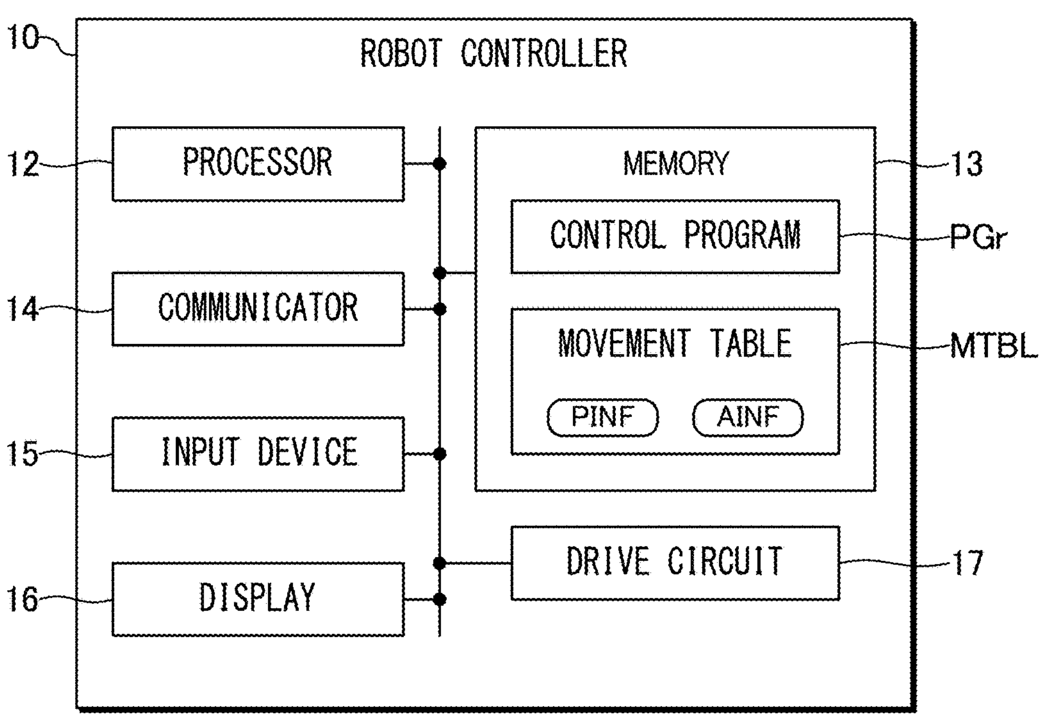
FIG. 2 is a diagram showing an exemplary hardware configuration of a robot controller shown in FIG. 1.

FIG. 2 is a diagram showing an exemplary hardware configuration of the robot controller 10 shown in FIG. 1.

The robot controller 10 includes a processor 12 that controls components of the robot controller 10, a memory 13 that stores a variety of information, a communicator 14, an input device 15 that receives user instructions from the operator U, a display 16, and a drive circuit 17.

In one example, the memory 13 comprises one or both of (i) a volatile memory (e.g., a RAM (Random Access Memory)) for a workspace of the processor 12 and (ii) a non-volatile memory (e.g., an EEPROM (Electrically Erasable Programmable Read-Only Memory) for a variety of information including a control program PGr. The memory 13 may be a storage medium (e.g., a memory card) and may be attached to or detached from the robot controller 10. The memory 13 may be an on-line storage communicably connected to the robot controller 10 via a network.

The memory 13 shown in FIG. 2 stores the control program PGr and movement table MTBL. The control program PGr is an example of a "program." In the embodiment, the control program PGr includes an application program for the robot controller 10 to control physical movements of the robot 20. However, the control program PGr may include an operating robot system for the processor 12 to control the components of the robot controller 10.

In one example, the movement table MTBL includes position information PINF and orientation information AINF. Detailed description of the movement table MTBL will be described later (see FIG. 7). The position information PINF indicates a position of the terminal apparatus 30 and is used to define a position of the end effector HP of the robot 20. The orientation information AINF indicates an orientation of the terminal apparatus 30 and is used to define an orientation of the end effector HP.

The processor 12 controls the entire robot controller 10 and comprises one or more CPUs (Central Processing Units). In one example, the processor 12 executes the control program PGr stored in the memory 13 and operates in accordance with the control program PGr to act as a robot control section 120 (see FIG. 3). The control program PGr may be transmitted from another apparatus via a network.

For the processor 12 comprising CPUs, one, some, or all of the functions thereof may be implemented by cooperating operation of the CPUs in accordance with a program (e.g., the control program PGr). The processor 12 may comprise hardware, such as a GPU (Graphics Processing Unit), a DSP (Digital Signal Processor), or a FPGA (Field Programmable Gate Array) in addition to, or in place of, one, some, or all of the CPUs. In such a case, one, some, or all of the functions of the processor 12 may be implemented by hardware (e.g., a DSP).

The hardware communicator 14 communicates with an external apparatus outside the robot controller 10. In one example, the communicator 14 communicates with an external apparatus by short-range wireless communication. The communicator 14 may communicate with an external device via a mobile communication network or a network.

The input device 15 comprises a keyboard, a mouse, switches, buttons, sensors, etc. and receives user inputs. In one example, the input device 15 receives user inputs from the operator U and outputs information on the received instructions to the processor 12.

In one example, the display 16 is an output device and shows images under the control of the processor 12. A touch panel with functions of the input device 15 and the display 16 may be employed.

The drive circuit 17 outputs to the robot 20, a signal for driving the robot 20 (e.g., the body BDP, the arms AP, and the end effector HP) under the control of the processor 12.

Description will be given of functions of the robot controller 10 with reference to FIG. 3.

Figure 3:
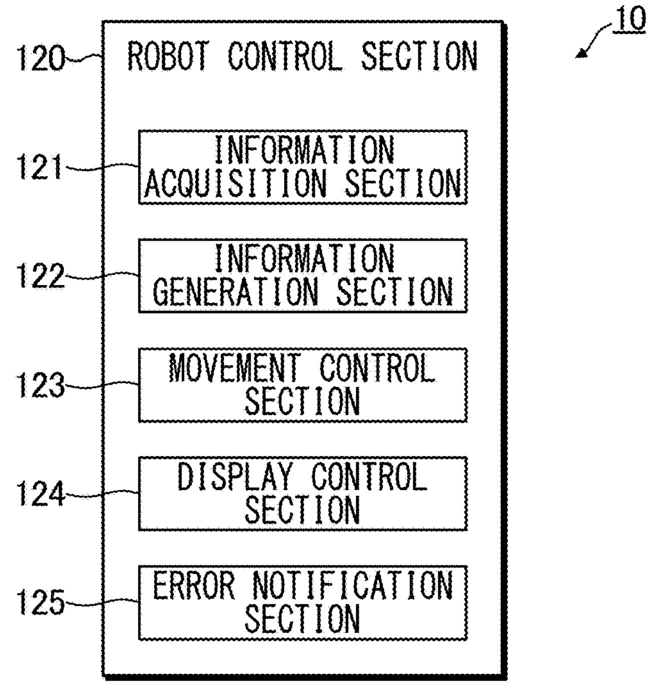
FIG. 3 is an exemplary functional block diagram of the robot controller shown in FIG. 1.

FIG. 3 is an exemplary functional block diagram of the robot controller 10 shown in FIG. 1.

A robot control section 120 is implemented by the processor 12 as described in FIG. 2. For the processor 12 comprising CPUs, one, some, or all of the functions of the robot control section 120 may be implemented by the CPUs that operate in cooperation with each other in accordance with the control program PGr. For the processor 12 comprising a DSP, one, some, or all of the functions of the robot control section 120 may be implemented by the DSP.

In one example, the robot control section 120 includes an information acquisition section 121, an information generation section 122, a movement control section 123, a display control section 124, and an error notification section 125.

In one example, the information acquisition section 121 acquires from the image capture device (detector) 40, position information PINF indicating a position of the terminal apparatus 30. The information acquisition section 121 acquires from the terminal apparatus 30, orientation information AINF indicating an orientation of the terminal apparatus 30. Specifically, when the operator U provides the terminal apparatus 30 with sending instructions to transmit information (e.g., position information PINF and orientation information AINF) to the robot controller 10, the orientation information AINF is transmitted from the terminal apparatus 30 as well as the position information PINF is transmitted from the image capture device 40. In other words, the information acquisition section 121 acquires the position information PINF and the orientation information AINF in response to a receipt of the sending instructions from the terminal apparatus 30. In one example, the sending instructions (an example of "predetermined instructions") may be output when a send button of an input device 35 is clicked (pressed).

Based on the position information PINF and the orientation information AINF acquired by the information acquisition section 121, the information generation section 122 generates movement information defining a position and orientation of the end effector HP of the robot 20. Specifically, the information generation section 122 writes (registers) in the movement table MTBL, the position indicated by the acquired position information PINF and the orientation indicated by the acquired orientation information AINF. Hereinafter, a position indicated by the position information MTBL written in the movement table MTBL is occasionally referred to as a "position registered in the movement table MTBL (or a registered position)." Similarly, an orientation indicated by the orientation information AINF written in the movement table MTBL is occasionally referred to as a "orientation registered in the movement table MTBL (or a registered orientation)."

Specifically, the information generation section 122 accepts the position and orientation registered in the movement table MTBL as a target position and orientation of the end effector HP of the robot 20. The registered position and orientation are defined as the target position and orientation of the end effector HP. Accordingly, a position and orientation written in the movement table MTBL correspond to a position and orientation of the end effector HP, respectively. In other words, the position information PINF and the orientation information AINF written in the movement table MTBL correspond to the movement information. Thus, the information generation section 122 accepts the position and orientation registered in the movement table MTBL as a target position and orientation of the end effector HP, and then generates movement information defining the target position and orientation.

The movement control section 123 controls the robot 20 based on the position information PINF and the orientation information AINF acquired by the information acquisition section 121. Specifically, the movement control section 123 controls the robot 20 by controlling the drive circuit 17 based on the position and orientation registered in the movement table MTBL.

The movement control section 123 may control the robot 20 based on calibration information that is used to calibrate the position and orientation registered in the movement table MTBL. In one example, the movement control section 123 may receive calibration information indicating a position and orientation of the end effector HP through a Graphical User Interface (GUI), such as an input screen CHS (see FIG. 8). The movement control section 123 may then calibrate the registered position and orientation based on the calibration information.

The movement control section 123 may calibrate the registered position and orientation based on the calibration information obtained by a direct manipulation of the robot 20 by the operator U. Specifically, after the end effector HP acts based on the registered position and orientation, the operator U may visually check the position and orientation of the end effector HP. The operator U may then manipulate the robot 20 to adjust (change) a current position and orientation of the end effector HP to the target position and orientation. The movement control section 123 acquires calibration information indicating the adjusted position and orientation of the end effector HP and calibrates the registered position and orientation based on the calibration information.

In one example, the calibrated position and orientation based on the calibration information are registered in the movement table MTBL and are accepted by the information generation section 122 as a position and orientation defined by the movement information.

Figure 8:
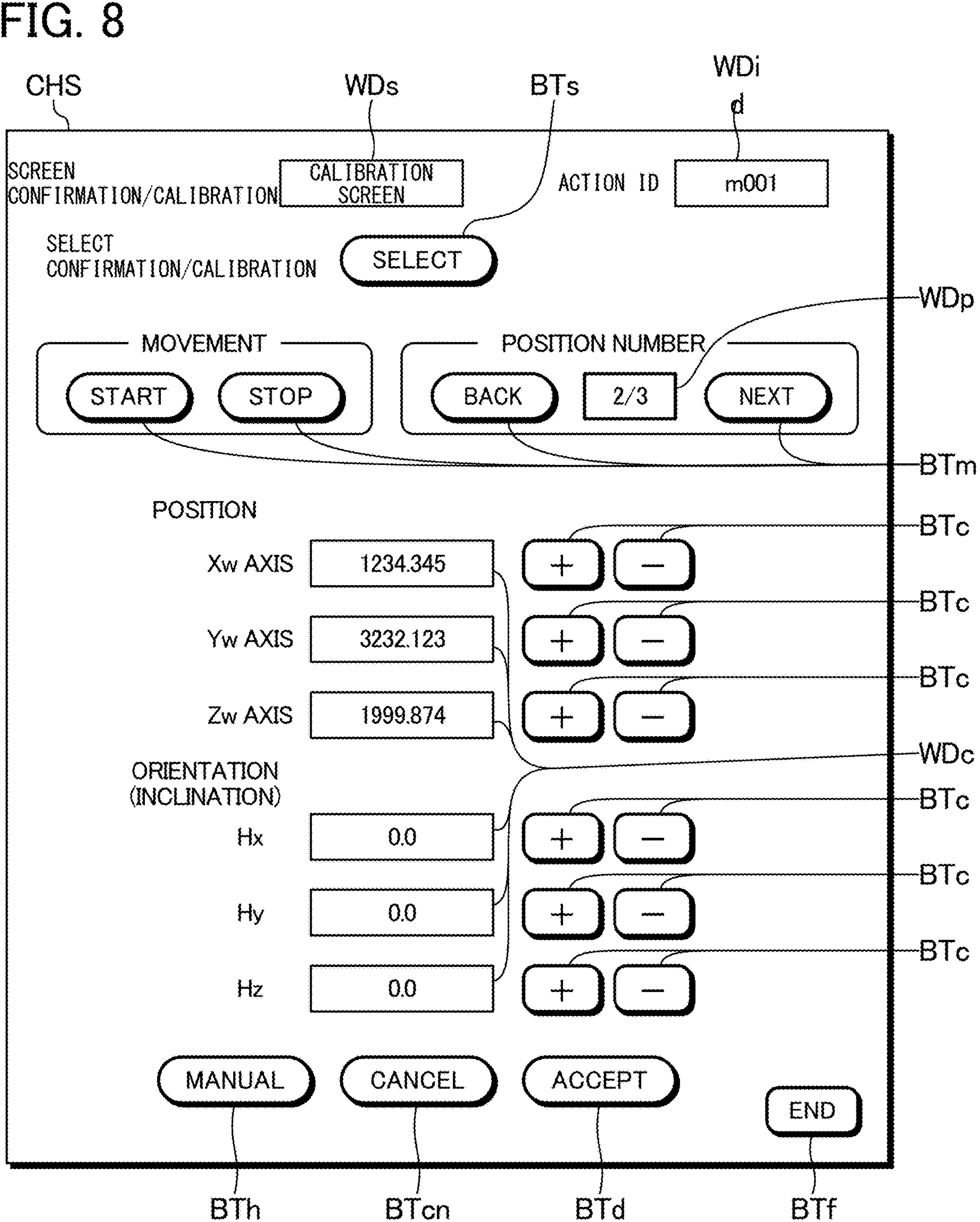
FIG. 8 is an explanatory diagram of an input screen.

In one example, the display control section 124 shows on the display 16, a variety of images, such as the input screen CHS shown in FIG. 8.

In one example, the error notification section 125 determines if a position indicated by the position information PINF falls within a movable range of the end effector HP of the robot 20 every time the position information PINF is acquired by the information acquisition section 121. The error notification section 125 notifies of an error when the position is out of the movable range.

In one example, to notify the operator U, the error notification section 125 may output a beep, which indicates that a current position of the terminal apparatus 30 is out of the movable range of the robot 20. Alternatively, the error notification section 125 may transmit to the terminal apparatus 30, error information indicating that a current position of the terminal apparatus 30 is out of the movable range. In this case, the terminal apparatus 30 may output a beep.

The error notification, such as a beep, enables for the operator U to notice that the terminal apparatus 30 is out of the movable range of the end effector HP of the robot 20 while moving the terminal apparatus 30 along a movement path corresponding to the task. As a result, the operator U can efficiently move the terminal apparatus 30 within the movable range of the end effector HP, which improves efficiencies of the task to move the terminal apparatus 30 along the movement path.

The configuration of the robot controller 10 is not limited to such an example shown in FIGS. 2 and 3. In one example, the error notification section 125 may be omitted.

Description will now be given of a hardware configuration of the terminal apparatus 30 with reference to FIG. 4.

Figure 4:
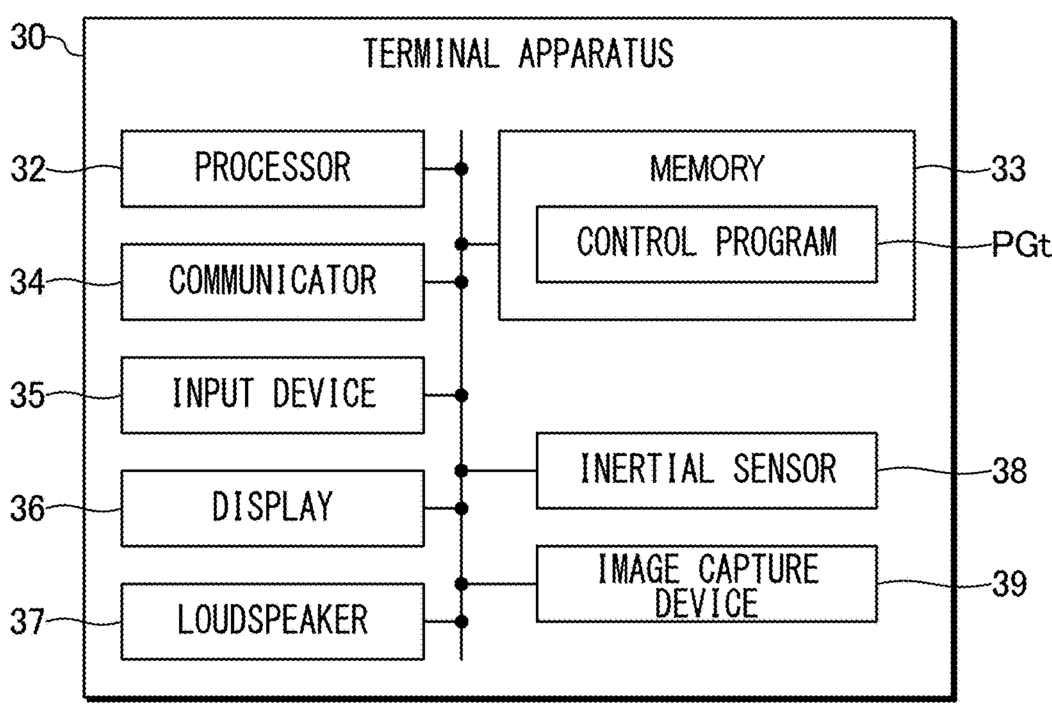
FIG. 4 is a diagram showing an exemplary hardware configuration of a terminal apparatus shown in FIG. 1.

FIG. 4 is a diagram showing an exemplary hardware configuration of the terminal apparatus 30 shown in FIG. 1.

The terminal apparatus 30 includes a processor 32 that controls components of the terminal apparatus 30, a memory 33 that stores a variety of information, a communicator 34, an input device 35, a display 36, a loudspeaker 37, an inertial sensor 38, and an image capture device 39.

In one example, the memory 33 comprises one or both of a volatile memory (e.g., a RAM) for a workspace of the processor 32 and a non-volatile memory (e.g., an EEPROM) for a variety of information including a control program PGt. In a manner similar to that for the memory 13 of the robot controller 10 described in FIG. 2, the memory 33 may be attachable to, or be detached from the terminal apparatus 30, or it may be an on-line storage connected via a network to the terminal apparatus 30.

The processor 32 controls the entire terminal apparatus 30. In a manner similar to that for the processor 12 of the robot controller 10 described in FIG. 2, processor 32 may comprise one or more CPUs. The processor 32 executes the control program PGt stored in the memory 33 and operates in accordance with the control program PGt, to act as a terminal control section 320 (see FIG. 5). The control program PGt may be transmitted from another apparatus via a network.

For the processor 32 comprising CPUs, one, some, or all of the functions thereof may be implemented by cooperating operation of the CPUs in accordance with a program (e.g., the control program PGt). The processor 32 may comprise hardware, such as a GPU (Graphics Processing Unit), a DSP (Digital Signal Processor), or a FPGA (Field Programmable Gate Array) in addition to one or more CPUs, or in place of, one, some or all of the CPUs. In this case, one, some, or all the functions of the processor 32 may be implemented by hardware (e.g., a DSP).

The hardware communicator 34 communicates with an external apparatus outside the terminal apparatus 30. In one example, the communicator 34 communicates with an external apparatus by short-range wireless communication. The communicator 34 may communicate with an external device via a mobile communication network or a network.

The input device 35 comprises keys (keyboard), switches, buttons, a mouse, and sensors, etc. and receives user inputs. In one example, the input device 35 receives user instructions from the operator U and outputs information on the received instructions to the processor 32.

In one example, the display 36 is an output device and shows images under the control of the processor 32. A touch panel with functions of the input device 35 and the display 36 may be employed.

The hardware loudspeaker 37 outputs a variety of sounds under the control of the processor 32.

In one example, the inertial sensor 38 detects an acceleration of the terminal apparatus 30 in each of the Xw, Yw and Zw axes in the three-dimensional physical space, and an angular velocity of the terminal apparatus 30 in each of the Xw, Yw and Zw axes. The acceleration in each of the Xw, Yw and Zw axes is detected to measure a movement distance of the terminal apparatus 30. In the embodiment, the angular velocity in each of the Xw, Yw and Zw axes is required to detect an inclination (orientation) relative to a gravitational direction of the terminal apparatus 30.

In one example, the image capture device 39 is a camera that includes optical elements and captures images of a subject. The image capture device 39 generates image information indicating the captured images. In the embodiment, the image capture device 39 does not necessarily have a function of measuring a distance from the image capture device 39 to the object (i.e., a three-dimensional camera) because a position of the terminal apparatus 30 is measured by the image capture device 40. However, the image capture device 39 may have such a function (i.e., a three-dimensional camera).

Description will now be given of functions of the terminal apparatus 30 with reference to FIG. 5.

Figure 5:
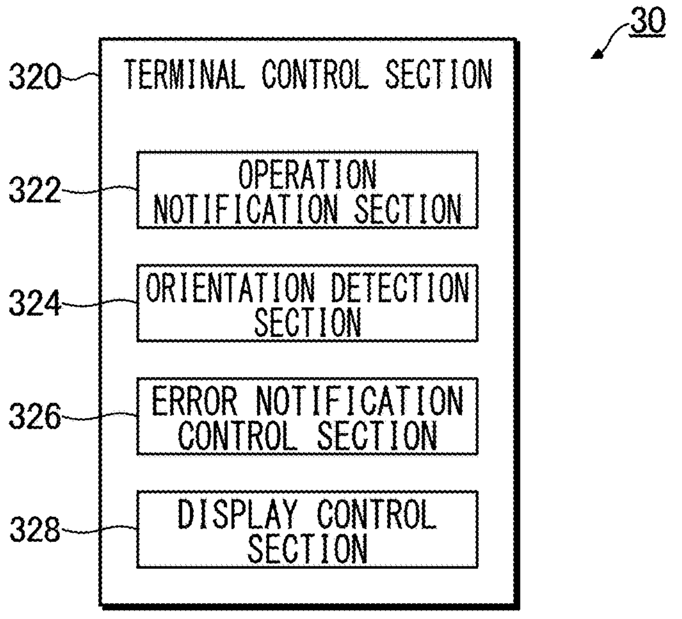
FIG. 5 is an exemplary functional block diagram of the terminal apparatus shown in FIG. 1.

FIG. 5 is an exemplary functional block diagram of the terminal apparatus 30 shown in FIG. 1.

As described in FIG. 4, the terminal control section 320 is implemented by the processor 32. For the processor 32 comprising CPUs, one, some, or all of the functions of the terminal control section 320 may be implemented by the CPUs that operate in cooperation with each other in accordance with the control program PGt. For the processor 32 comprising a DSP, one, some, or all of the functions of the terminal control section 320 may be implemented by the DSP.

In one example, the terminal control section 320 includes an operation notification section 322, an orientation detection section 324, an error notification control section 326, and a display control section 328.

When the input device 35 receives user instructions on one or both of the robot controller 10 and the image capture device 40, the operation notification section 322 notifies the image capture device 40 of the received user instructions. Specifically, when the input device 35 receives sending instructions to transmit information (e.g., position information PINF and orientation information AINF) to the robot controller 10, the operation notification section 322 transmits to the image capture device 40, instruction information for transmitting position information PINF. The instruction information may be transmitted from the terminal apparatus 30 to the image capture device 40 via the robot controller 10.

The orientation detection section 324 detects an orientation of the terminal apparatus 30 based on acceleration velocities and angular velocities from the inertial sensor 38 and generates orientation information AINF indicating the detected orientation. The orientation detection section 324 then transmits the orientation information AINF to the robot controller 10 via the communicator 34, in response to a receipt of the sending instructions from the input device 35. Specifically, in response to the sending instructions, the orientation detection section 324 detects an orientation of the terminal apparatus 30 and transmits to the robot controller 10, the orientation information AINF indicating the detected orientation of the terminal apparatus 30.

In one example, the error notification control section 326 controls the loudspeaker 37 to output a beep in response to a receipt of caution information from the robot controller 10 via the communicator 34. As a result, the operator U holding the terminal apparatus 30 can notice that a current position of the terminal apparatus 30 is out of the movable range of the robot 20.

In one example, the display control section 328 shows a variety of images on the display 36. The display control section 328 may show on the display 36, GUI images representative of user instructions.

The configuration of the terminal apparatus 30 is not limited to the example shown in FIGS. 4 and 5. In one example, one, some, or all of the display 36, the loudspeaker 37 and the image capture device 39 may be omitted. The terminal apparatus 30 may include a vibrator. In this case, the error notification control section 326 may control the vibrator to vibrate to notify the operator U of a current position of the terminal apparatus 30 being out of the movable range of the robot 20. Alternatively, the terminal apparatus 30 may include a LED. In this case, the error notification section 326 may emit the LED to notify the operator U of the current position of the terminal apparatus 30 being out of the movable range of the robot 20. Furthermore, the sensor used to detect an orientation of the terminal apparatus 30 is not limited to the inertial sensor 38. The terminal apparatus 30 may include a magnetic sensor in addition to or in place of the inertial sensor 38.

An outline of procedures of the robot system 1 will be described with reference to FIG. 6.

Figure 6:
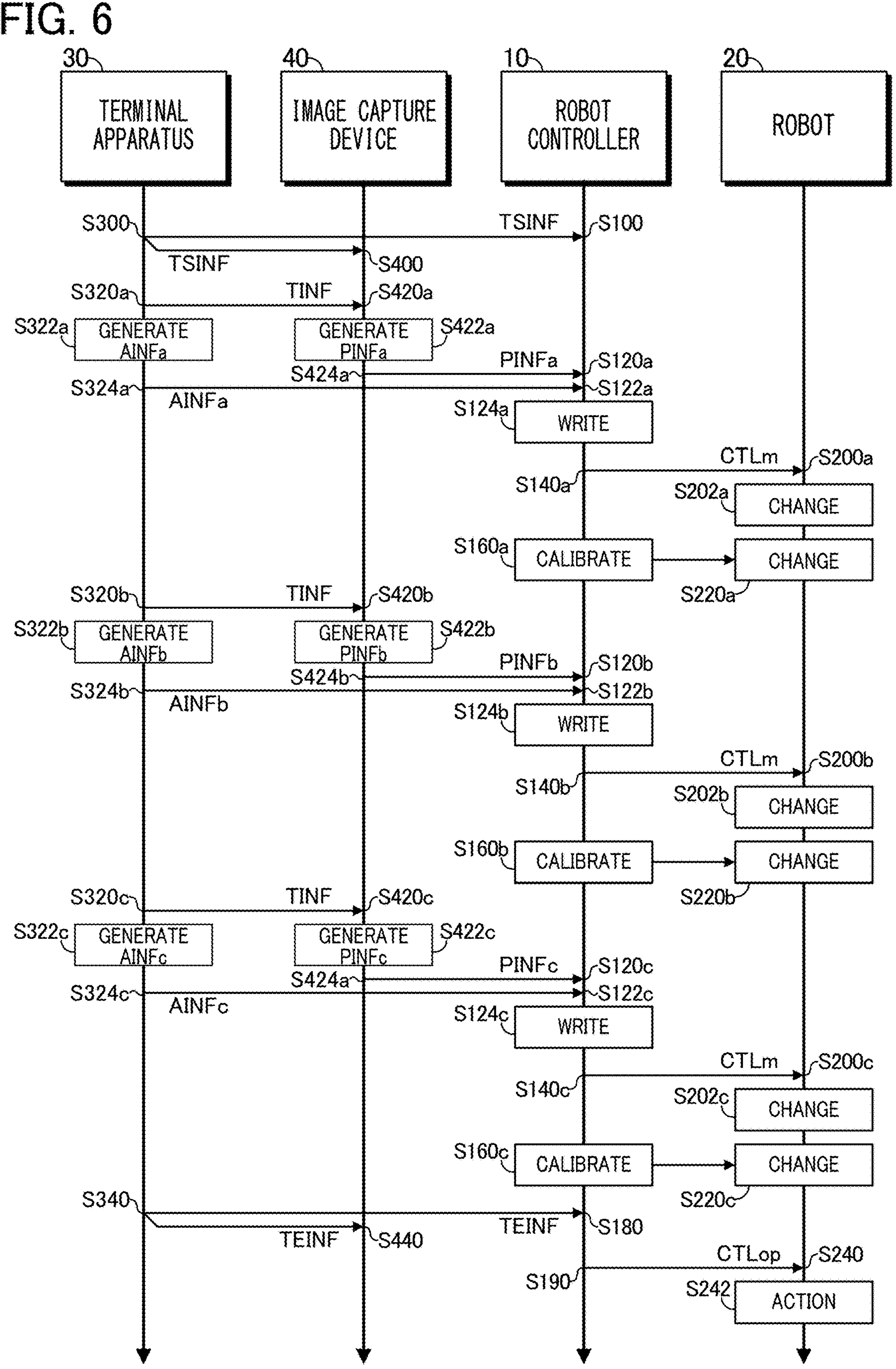
FIG. 6 is an exemplary sequence chart of procedures for the robot system shown in FIG. 1.

FIG. 6 is an exemplary sequence chart of procedures for the robot system 1 shown in FIG. 1. The main description of the robot system 1 shown in FIG. 6 will now be given of teaching the robot 20 an action of a task. In the example of FIG. 6, it is envisaged that a position indicated by the position information PINF and an orientation indicated by the orientation information AINF are calibrated by the robot controller 10 every time the pieces of information (PINF and AINF) are acquired by the robot controller 10.

First, the terminal apparatus 30 transmits to the robot controller 10 and the image capture device (detector) 40, teaching initiate information TSINF indicating a start of robot teaching (i.e., teaching the robot 20 an action) (S300). Specifically, when the operator U provides the terminal apparatus 30 with instructs to start the robot teaching, the terminal apparatus 30 transmits the teaching initiate information TSINF to the robot controller 10 and the image capture device 40. In response to receipt of the teaching initiate information TSINF (S100 and S400), the robot controller 10 and the image capture device 40 detect a start of the robot teaching.

In one example, the image capture device 40 may start a capture of an image of the terminal apparatus 30 in response to a receipt of the teaching initiate information TSINF. Furthermore, the robot controller 10 may move the end effector HP out of the viewing range of the image capture device 40 in response to a receipt of the teaching initiate information TSINF. An image of the terminal apparatus 30 may be captured by the image capture device 40 before transmission of the teaching initiate informational TSINF (before the start of the robot teaching). Furthermore, the end effector HP may be moved out of the viewing range of the image capture device 40 before the transmission.

Next, the terminal apparatus 30 receives sending instructions to transmit information (e.g., the position information PINF and the orientation information AINF) to the robot controller 10. In the example shown in FIG. 6, it is envisaged that during the robot teaching, three sending instructions (first, second and third sending instructions) are provided by the operator U. For each of the sending instructions, the following are executed: (i) steps S320 through S324, (ii) steps S420 through S424, (iii) steps S120 through S160, and (iv) steps S200 through S220. In FIG. 6, steps S120 through S160, steps S200 through S220, steps S320 through S324, and steps S420 through S424 are each appended with a lower case letter (a, b, or c) followed by the steps to distinguish from other repeated steps. Similarly, the positional information PINF and the postural information AINF are each appended with a lower case letter (a, b, or c) followed by the steps.

In one example, in response to a receipt of the first sending instructions, the terminal apparatus 30 transmits to the image capture device 40, instruction information TINF indicating transmission of position information PINF (S320*a*). Thereafter, the image capture device 40 receives the instruction information TINF (S420*a*). Furthermore, in response to the receipt of the first sending instructions, the terminal apparatus 30 detects a current orientation of the terminal apparatus 30 and generates orientation information AINFa indicating the detected orientation (S322*a*). The terminal apparatus 30 then transmits the generated orientation information AINFa to the robot controller 10 (S324*a*). Thereafter, the robot controller 10 receives the orientation information AINFa, which was generated at the first sending instructions (S122*a*).

In response to a receipt of the instruction information TINF, the image capture device 40 generates position information PINFa indicating a current position of the terminal apparatus 30 (S422*a*). The image capture device 40 then transmits the generated position information PINFa to the robot controller 10 (S424*a*). Thus, in response to a receipt by the terminal apparatus 30 of the first sending instructions, the image capture device 40 generates position information PINFa indicating an orientation of the terminal apparatus 30, and transmits the generated position information PINFa to the robot controller 10. Thereafter, the robot controller 10 receives from the image capture device 40, the position information PINFa, which was generated at the first sending instructions (S120*a*).

Thus, in response to the receipt by the terminal apparatus 30 of the first sending instructions, the robot controller 10 acquires the position information PINFa and orientation information AINFa. The robot controller 10 then writes in the movement table MTBL, the position information PINFa acquired from the image capture device 40 and the orientation information AINFa acquired from the terminal apparatus 30 (S124*a*). The position indicated by the position information PINFa and the orientation indicated by the orientation information AINFa are registered in the movement table MTBL.

Next, the robot controller 10 outputs a drive signal CTLm to the robot 20 (S140*a*). The drive signal CTLm is a signal to set a current position and orientation of the end effector HP of the robot 20 to the position and orientation registered in the movement table MTBL. Thereafter, the robot 20 receives the drive signal CTLm (S200*a*). The robot 20 then changes the current position and orientation of the end effector HP based on the drive signal CTLm (S202*a*).

Next, the robot controller 10 calibrates the position and orientation registered in the movement table MTBL (S160*a*). Specifically, the robot controller 10 controls a movement of the robot 20 based on the calibration information acquired through a GUI (e.g., the input screen CHS shown in FIG. 8). As a result, the current position and orientation of the end effector HP of the robot 20 are changed to a calibrated position and orientation indicated by the calibration information (S220*a*).

In one example, steps S160*a* and S220*a* are repeated until a current position and orientation of the end effector HP are set to a target (defined) position and orientation. After the end of the calibration of the registered position and orientation, the robot controller 10 moves the end effector HP out of the viewing range of the image capture device 40.

A position and orientation of the end effector HP of the robot 20 may be changed by a direct manipulation of the robot 20 by the operator U. In this case, the robot controller 10 may calibrate the position and orientation registered in the movement table MTBL based on the position and orientation adjusted by the operator U.

Upon ending of steps S160*a* and S220*a*, procedures for the first sending instructions are ended (steps S120*a* through S160*a*, steps S200*a* through S220*a*, steps S320*a* through S324*a*, and steps S420*a* through S422*a*).

Procedures for second and third sending instructions are also executed in the similar manner as for the first sending instructions. Specifically, in response to a receipt by the terminal apparatus 30 of the second sending instructions, the robot controller 10 acquires new position information PINFb and orientation information AINFb (S120*b* and S122*b*). Furthermore, in response to a receipt by the terminal apparatus 30 of the third sending instructions, the robot controller 10 acquires new position information PINFc and orientation information AINFc (S120*c* and S122*c*).

In one example, after the third sending instructions, the operator U provides the terminal apparatus 30 with instructions to end the robot teaching. In response to the instructions, the terminal apparatus 30 transmits to the robot controller 10 and the image capture device 40, end teaching information TEINF indicating an end of the robot teaching (S340). In response to a receipt of the end teaching information TEINF (S180 and S440), the robot controller 10 and the image capture device 40 detect the end of the robot teaching.

In one example, in response to a receipt of the end teaching information TEINF, the robot controller 10 accepts the positions and orientations registered in the movement table MTBL as target positions and orientations of the end effector HP of the robot 20 that will implement an action of the task. Movement information, that is, the target positions and orientations of the end effector HP, are written in the movement table MTBL. In response to a receipt of the end teaching information TEINF, the image capture device 40 ends a capture of an image of the terminal apparatus 30.

After the end of the robot teaching, the robot controller 10 outputs to the robot 20, a drive signal CTLop for the robot 20 to implement an action (S190). Based on the drive signal CTLop, the robot 20 implements the action, which follows the target positions and orientations indicated by the movement information (S242).

The procedures for the robot system 1 are not limited to the example shown in FIG. 6. In one example, the beginning and end of the robot teaching may be instructed with the input device 15 of the robot controller 10. The positions and orientations registered in the movement table MTBL may be calibrated as required. Alternatively, the calibration thereof may be omitted. After the second or third sending instructions, the robot controller 10 may calibrate the following: (i) the first position indicated by the position information PINFa (given at the first sending instructions), and (ii) the first orientation indicated by the orientation information AINFa (given at the first sending instructions). Similarly, after the third sending instructions, the robot controller 10 may calibrate the following: (i) the second position indicated by the position information PINFb (given at the second sending instructions), and (ii) the second orientation indicated by the orientation information AINFb (given at the second sending instructions).

In one example, the terminal apparatus 30 does not necessarily transmit the instruction information TINF to the image capture device 40. In this case, in response to an acquisition of the orientation information APINF from the terminal apparatus 30, the robot controller 10 may request transmission of position information PINF to the image capture device 40.

The movement table MTBL will now be described with reference to FIG. 7.

FIG. 7 is an explanatory diagram of the movement table MTBL shown in FIG. 2.

The movement table MTBL shown in FIG. 7 includes a list of pieces of movement information. One or more pieces of movement information constitute one action of the task. In one example, one action is identified by one action ID. The number of records comprising one action ID is identical to the number of pieces of position information PINF acquired by the robot controller 10 (the information acquisition section 121) in the robot teaching for this action ID. Each record includes a position number, a position of the end effector HP defined by position information PINF, an orientation of the end effector HP defined by orientation information AINF, and an action that will be implemented by the robot 20. In the embodiment, the position numbers are set (listed) in the order in which the pieces of position information PINF are acquired by the information acquisition section 121.

In one example, each position number represents an order in which the end effector HP is moved to a position indicated by the movement information. For example, for an action ID of "m001," position numbers (e.g., "1," "2" and "3") represent that the end effector HP is moved from a position Pa indicated by position information PINFa to a position Pc indicated by position information PINFc via a position Pb indicated by position information PINFb.

In one example, for example, for the action ID of "m001," corresponding records (pieces of corresponding movement information) includes (i) pieces of position information PINFa, PINFb and PINFec, and (ii) pieces of orientation information AINFa, AINFb and AINFc. Furthermore, the records include physical movements comprising an action that will be implemented by the robot 20 at the respective positions indicated by the position information PINFa, PINFb and PINFec. Specifically, for the action ID of "m001," the corresponding records include the following (i), (ii) and (iii):

(i) a movement that will be implemented by the robot 20 at a position indicated by the position information PINFa (e.g., a start of application of a pigment to an object), (ii) a movement that will be implemented by the robot 20 at a position indicated by the position information PINFb (e.g., the application of the pigment to the object), and (iii) a movement that will be implemented by the robot 20 at a position indicated by the position information PINFc (e.g., an end of the application of the pigment to the object).

The movement table MTBL is not limited to the example shown in FIG. 7. In one example, each record (movement information) of a corresponding action ID does not necessarily include one or both of a position number and an action of that will be implemented by the robot 20 at a position indicated by the position information PINF. The actions of the robot 20 are not limited to the application of the pigment to the object.

An outline of the input screen CHS for calibrating a position and orientation registered in the movement table MTBL will be described with reference to FIG. 8.

FIG. 8 is an explanatory diagram of an input screen CHS. In FIG. 8, it is envisaged that the input screen CHS is switched between a confirmation screen and a calibration screen. The input screen CHS includes a confirmation screen that is used to confirm an action to be executed by the robot 20 based on the positions and orientations registered in the movement table MTBL. On the confirmation screen, user instructions to calibrate the registered positions and orientations are unavailable. The input screen CHS further includes a calibration screen that is used to control the robot 20 in accordance with the the registered positions and orientations, and then calibrate the registered positions and orientations. In FIG. 8, an outline of the calibration screen will be described.

In one example, the display control section 124 of the robot controller 10 outputs to the display 16, display information on the input screen CHS. The input screen CHS is shown on the display 16. The display information may be generated by the display control section 124 in response to a receipt by the robot controller 10 of user instructions to show the input screen CHS. Alternatively, the display information may be generated in response to a receipt by the robot controller 10 of teaching initiate information TSINF.

The input screen CHS includes boxes WD (WDs, WDid, WDp and WDc). A box WDs shows if the current input screen CHS is the confirmation screen or the calibration screen. A box WDid shows an action ID for an action to be executed. A box WDp shows a current position number. Boxes WDc show a position and orientation of the end effector HP of the robot 20 at a current position number. In one example, as described in FIG. 1, a position of the end effector HP is described by coordinates of the center of the surface SFh of the end effector HP. An orientation of the end effector HP is described by rotational angles thereof around the rotational axes Hx, Hy and Hz.

The input screen CHS further includes GUI buttons BT (BTs, BTm, BTc, BTcn, BTd, BTh and BTf). A "select" GUI button BTs is used to select the confirmation screen or the calibration screen. In the embodiment shown in FIG. 8, when the button BTs is clicked (pressed) by the operator U, the input screen CHS is switched from the calibration screen to the confirmation screen.

GUI buttons BTm are used to control actions (movements) of the robot 20. In one example, when a "start" button BTm is clicked, the movement control section 123 of the robot controller 10 controls the robot 20 based on the positions and orientations registered in the movement table MTBL. When a "stop" button BTm is clicked, the movement control section 123 stops the action of the robot 20. When a "back" button BTm is clicked, the movement control section 123 changes a current position and orientation of the end effector HP back to the previous position and orientation (corresponding to one previous position number from the current position number). When a "next" button BTm is clicked, the movement control section 123 changes a current position and orientation of the end effector HP to the next position and orientation (corresponding to the next position number from the current position number).

GUI "+" and "−" buttons BTc are used to input calibration information, which is used to calibrate the positions and orientations registered in the movement table MTBL. One or more of the buttons BTc are an example of "input receivers." The display 16, which shows the input screen CHS including the buttons BTc, may be interpretated as an "input receiver." In one example, the movement control section 123 changes one or both of a position and an orientation of the end effector HP based on the calibration information received through the buttons BTc.

In one example, when a "+" button BTc representative of the Xw axis is clicked, the movement control section 123 moves a current position of the end effector HP in the positive direction of the Xw axis. On the other hand, a "−" button BTc representative of the Xw axis is clicked, the movement control section 123 moves the position of the end effector HP in the negative direction of the Xw axis.

In one example, when a "+" button BTc representative of the rotational axis Hx is clicked, the movement control section 123 rotates the end effector HP around the rotational axis Hx such that the rotational angle of the end effector HP increases. When a "−" button BTc representative of the rotational axis Hx is clicked, the movement control section 123 rotates the end effector HP around the rotational axis Hx such that the rotational angle of the end effector HP decreases. The rotational angle of the end effector HP around the rotational axis Hx increases by rotating the end effector HP clockwise around the rotational axis Hx. In contrast, the rotational angle decreases by rotating the end effector HP counterclockwise around the rotational axis Hx.

A "cancel" GUI button BTcn is used to cancel without acceptance (use), the determined position and orientation of the end effector HP that will be calibrated based on the calibration information. In one example, when the "cancel" button BTcn is clicked, the movement control section 123 changes the determined position and orientation of the end effector HP back to the previous position and orientation that are not calibrated (at the current position number).

An "accept" GUI button BTd is used to accept the positions and orientations registered in the movement table MTBL as target positions and orientations of the end effector HP (i.e., movement information). In one example, when the "accept" button BTd is clicked, the information generation section 122 accepts (uses) the registered positions and orientations as target positions and orientations (i.e., movement information).

A "manual" GUI button BTh is used to manually acquire calibration information indicating a position and orientation of the end effector HP. The calibration information is acquired by the movement control section 123 when the robot 20 is manipulated by the operator U. In one example, when the button BTh is clicked, the movement control section 123 acquires the calibration information. The display control section 124 controls the display 16 to show in the boxes WDc, the calibrated position (coordinates) and orientation (rotational angles) indicated by the calibration information.

An "end" GUI button BTf is used to end the input screen CHS. The positions and orientations registered in the movement table MTBL may remain unchanged when one or more of the "+" and "−" buttons BTc are clicked for the calibration and when the "end" button BTf is then clicked without a click of the "accept" button BTd. Alternatively, in such a case, the registered positions and orientations may be accepted as target positions and orientations of the end effector HP (i.e., the movement information). Yet alternatively, in such a case, GUI options to change the registered positions and orientations may be presented.

The input screen CHS is not limited to the example shown in FIG. 8. In one example, numerical values (coordinates and angles) indicating a target position and orientation of the end effector HP may be entered directly into the boxes WDc by the operator U. In this case, one or more of the boxes WDc correspond to "input receivers." In one example, the movement control section 123 receives calibration information through the boxes WDc. The movement control section 123 then changes one or both of a current position and an orientation of the end effector HP based on the calibration information received through the boxes WDc.

In one example, the "+" and "−" buttons BTc, the "cancel" button BTcn and the "accept" button BTd are unavailable on the confirmation screen, but are shown on the input screen CHS. However, the buttons BTc, BTcn and BTd are not required to be shown on the input screen CHS. Since the movements of the robot 20 can be confirmed through the calibration screen, the input screen CHS may include only the calibration screen.

In FIG. 8, an example is given of the "+" and "−" buttons BTc corresponding to an "input receiver." However, the robot controller 10 may be provided with physical buttons with the same function as the buttons BTc. In this case, physical buttons correspond to the input device 15 and are an example of an "input receiver."

The input screen CHS may be shown on the display 36 of the terminal apparatus 30. In this case, display information for displaying the input screen CHS on the display 36 may be generated by the display control section 124 of the robot controller 10, or it may be generated by the display control section 328 of the terminal apparatus 30. In one example, the terminal apparatus 30 may be provided with physical buttons with the same function as the "+" and "−" buttons BTc, which correspond to the input device 35.

An outline of procedures for the robot controller 10 will now be described with reference to FIG. 9.

Figure 9:
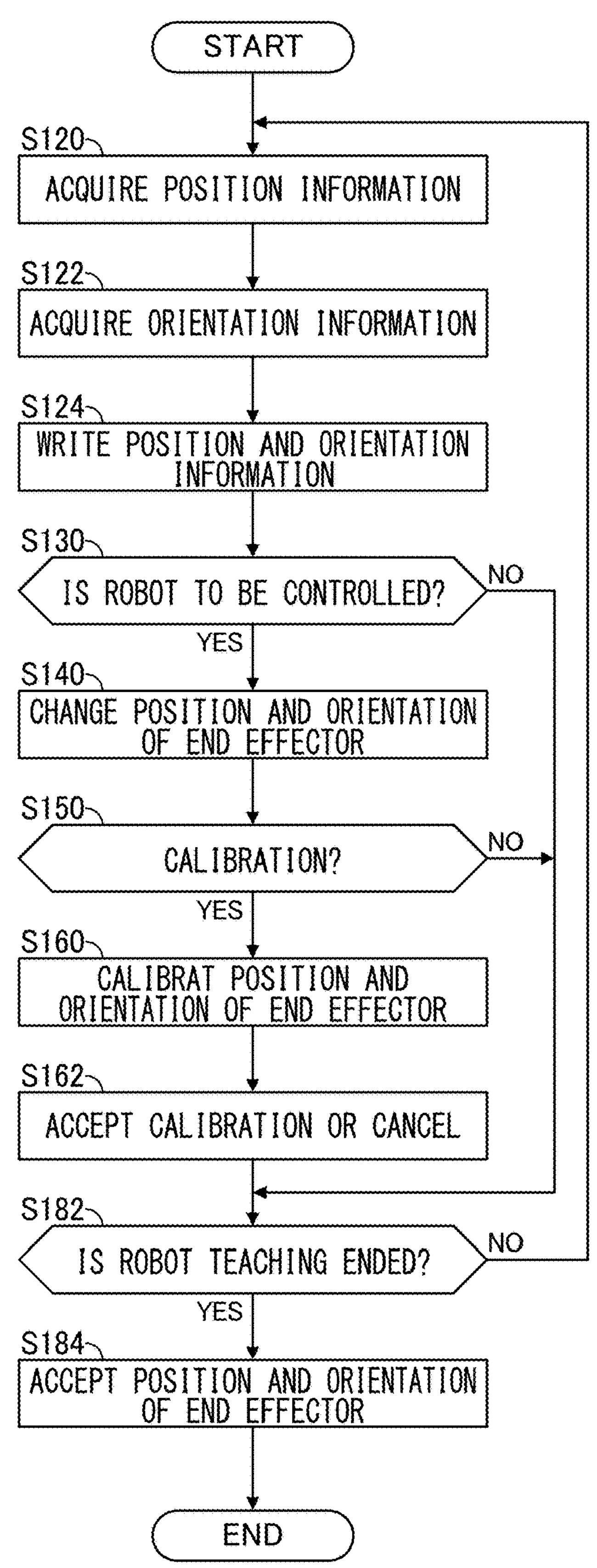
FIG. 9 is an explanatory flowchart of procedures for the robot controller shown in FIG. 1.

FIG. 9 is an explanatory flowchart of procedures for the robot controller 10 shown in FIG. 1. In an example of the procedures shown in FIG. 9, user instructions to start the robot teaching are received by the terminal apparatus 30 or the robot controller 10. The same description of the procedures shown in FIG. 6 will be omitted. In FIG. 9, it is envisaged that user instructions to start and end the robot teaching are received by the input device 35 of the terminal apparatus 30. In one example, step S120 is executed after user instructions to start the robot teaching are received by the input device 35. Furthermore, in FIG. 9, it is envisaged that the input screen CHS is shown before step S120.

First, at step S120, the processor 12 acts as the information acquisition section 121 and acquires from the image capture device 40, position information PINF indicating a position of the terminal apparatus 30.

Next, at step S122, the processor 12 acts as the information acquisition section 121 and acquires from the terminal apparatus 30, orientation information AINF indicating an orientation of the terminal apparatus 30.

Next, at step S124, the processor 12 acts as the information generation section 122 and writes in the movement table MTBL, the position information PINF acquired at step S120 and the orientation information AINF acquired at step S122.

Next, at step S130, the processor 12 acts as the movement control section 123 and determines if the robot 20 is to be controlled.

Alternatively, the processor 12 may determine if the robot 20 and the image capture device 40 were calibrated already. If the robot 20 and the image capture device 40 were calibrated already, the terminal apparatus 30 and the robot 20 were also calibrated. For this reason, it is unnecessary to determines if the robot 20 is to be controlled. Otherwise, it is necessary to determine if the robot 20 is to be controlled and align a position of the robot 20 with a position taught by the terminal apparatus 30.

Furthermore, the processor 12 may determine if the robot 20 is to be controlled in order to detect obstacles in addition to calibrations of the robot 20 and the image capture device 40.

For such a determination, the movement control section 123 may detect clicks (presses) of one or more of the buttons BTm shown on the input screen CHS. In this case, the movement control section 123 determines that the robot 20 is to be controlled, when one or more of the buttons BTm are clicked before information (e.g., the teaching end information TEINF, the next position information PINF or the next orientation information APINF) is received by the communicator 14 of the robot controller 10.

When a result of the determination at step S130 is affirmative, the processor 12 advances the processing to step S140. Otherwise, the processor 12 advances the processing to step S182.

At step S140, the processor 12 acts as the movement control section 123 and changes a current position and orientation of the end effector HP based on the position and orientation registered in the movement table MTBL. The processor 12 then advances the processing to step S150.

At step S150, the processor 12 acts as the movement control section 123 and determines if the registered position and orientation are to be calibrated. Specifically, in response to a detection of clicks of one or more of the "+" and "−" buttons BTc or a click of the "manual" button BTh shown on the input screen CH, the movement control section 123 determines if the calibration is to be executed. In this case, the movement control section 123 may determine that the calibration is to be executed when one or more of the buttons BTc or the "manual" button BTh is clicked before information (e.g., the teaching end information TEINF, the next position information PINF, or the next orientation information APINF) is received by the communicator 14. Alternatively, the movement control section 123 may determine that the calibration is to be executed when the numerical values indicating a target position of the end effector HP are entered into the boxes WDc before the information is received by the communicator 14.

When a result of the determination at step S150 is affirmative, the processor 12 advances the processing to step S160. Otherwise, the processor 12 advances the processing to step S182.

At step S160, the processor 12 acts as the action controller 123 and calibrates the position and orientation registered in the movement table MTBL. Specifically, the movement control section 123 calibrates the registered position and orientation based on the calibration information received through the "+" and "−" buttons BTc shown on the input screen CHS. The processor 12 then advances the processing to step S162.

At step S162, the processor 12 acts as the information generation section 122 and accepts the calibration executed at step S160 or cancels the calibration. Specifically, when the "accept" button BTd is clicked, the information generation section 122 accepts the calibration executed at step S160. When the "cancel" button BTcn is clicked, the information generation section 122 cancels the calibration executed at step S160. The processor 12 executes step S162 and then advances the processing to step S182.

At step S182, the processor 12 acts as the action controller 123 and determines an end of the robot teaching. Specifically, when teaching end information TEINF is received by the communicator 14 before receipt of the next position information PINF or the next orientation information APINF, the movement control section 123 determines that the robot teaching has been ended.

When a result of the determination at step S182 is affirmative, the processor 12 advances the processing to step S184. Otherwise, the processor 12 returns the processing to step S120.

At step S184, the processor 12 acts as the information generator 122. The processor 12 accepts (uses) the position and orientation registered in the movement table MTBL as a target position and orientation of the end effector HP, and then generates movement information defining the target position and orientation of the end effector HP. The accepted positions and orientations are listed in the order, thereby generating trajectory information on the robot 20. Each action of the robot 20 in accordance with the trajectory information is achieved by changing positions and orientations of the robot 20 (the end effector HP) in the order. It is noted that the calibration of the position and orientation at steps S130 through S182 (determination of whether the robot 20 is to be controlled) may be executed after generation of the trajectory information. Alternatively, the trajectory information may be generated from the calibrated position and orientation.

The procedures for the robot controller 10 are not limited to the example shown in FIG. 9. In one example, step S122 may be executed before step S120 or may be executed in conjunction with step S120.

In the foregoing embodiment, the robot controller 10 includes an information acquisition section 121 and an information generation section 122. The information acquisition section 121 acquires position information PINF indicating a position of the terminal apparatus 30, and orientation information AINF indicating an orientation thereof. The information generation section 122 generates movement information defining a position and orientation of the end effector HP of the robot 20 based on the position information PINF and the orientation information AINF acquired by the information acquisition section 121.

Thus, in the embodiment, movement information, which defines a target position and orientation of the end effector HP of the robot 20, is generated based on a position and orientation of the terminal apparatus 30. In the embodiment, the terminal apparatus 30 is moved by the operator U, which can reduce a physical and temporal burden on the operator U, as compared with a direct manipulation of the robot 20 (e.g., a technique for generating the movement information by a direct manipulation of the robot 20 from the beginning).

In the embodiment, the information acquisition section 121 acquires the position information PINF and the orientation information AINF when the operator U provides the terminal apparatus 30 with predetermined input instructions. In one example, the input instructions refer to sending instructions to transmit information (e.g., the position information PINF and the orientation information AINF) to the robot controller 10. When the operator U provides the terminal apparatus 30 with the predetermined instructions at a timing at which the position and orientation of the terminal apparatus 30 are changed to a target position and orientation thereof, the information acquisition section 121 can acquire with ease the target position defined by the position information PINF and the target position defined by the orientation information AINF.

In the embodiment, position information PINF is generated by the image capture device 40 that captures an image of the terminal apparatus 30. The generated position information PINF is acquired by the information acquisition section 121. Thus, in the embodiment, since the position information PINF is generated by the image capture device 40, it is possible to avoid for complicated processing for the robot controller 10, as compared with an aspect in which a position of the terminal apparatus 30 is measured by the robot controller 10. Furthermore, in the robot system 1 including the robot controller 10, the image capture device 40 may be a known camera, such as a three-dimensional camera that measures a position of an object. As a result, the robot system 1 according to the embodiment can be achieved easily.

In the embodiment, the robot controller 10 further includes a movement control section 123 that controls the robot 20 based on the position information PINF and the orientation information AINF acquired by the information acquisition section 121. As a result, it is easy for the operator U to confirm actions of the robot 20 based on the acquired position information PINF and the orientation information AINF. This confirmation enables efficiencies of generating movement information, which defines a target position and orientation of the end effector HP of the robot 20, to be improved.

In the embodiment, the movement control section 123 may acquire calibration information indicating a position and orientation of the end effector HP adjusted by the operator U. The movement control section 123 may then calibrate a position indicated by the position information PINF and an orientation indicated by the orientation information AINF based on the acquired calibration information. Such a calibration based on the acquired position and orientation enables a target position and orientation of the end effector HP of the robot 20 to be defined with accuracy.

In the embodiment, the robot controller 10 (the robot system 1) further includes an input receiver (e.g., the GUI buttons BTc shown on the input screen CHS) that receives calibration information. The calibration information is used to calibrate a position indicated by the position information PINF and an orientation indicated by the orientation information AINF. It is easy for the operator U to change with the buttons BTc a position and orientation of the end effector HP to a target position and orientation. As a result, an additional burden on the operator U can be reduced, and a position and orientation of the end effector HP can be defined with accuracy.

In the embodiment, the robot controller 10 further includes an error notification section 125. The error notification section 125 determines if a position indicated by the position information PINF falls within the movable range of the end effector HP. Furthermore, the error notification section 125 notifies of an error when the position of the end effector HP is out of a movable range of the end effector HP. As a result, the operator U can notice that a current position of the terminal apparatus 30 is out of the movable range of the robot 20 by a beep. In one example, in some cases, the operator U notices that the movement path of the terminal apparatus 30 is out of the movable range of the robot 20 after an end of movement of the terminal apparatus 30. In such a case, the operator U is required to move the terminal apparatus 30 again. Such work reduces efficiencies for generating movement information, which defines a position and orientation of the end effector HP. However, in the embodiment, efficiencies for the task for generating the movement information can be improved.

2. Modifications

The present disclosure is not limited to the foregoing exemplified embodiment. Specific modifications will now be exemplified below. Two or more modifications freely selected from following examples may be combined.

(1) First Modification

In the foregoing embodiment, an example is given in which the information acquisition section 121 acquires position information PINF and orientation information AINF when predetermined user instructions are received by the terminal apparatus 30. However, the present disclosure is not limited to such an aspect. In one example, the information acquisition section 121 may repeat an acquisition of the position information PINF and the orientation information AINF during an acquisition period (see FIG. 10).

Figure 10:
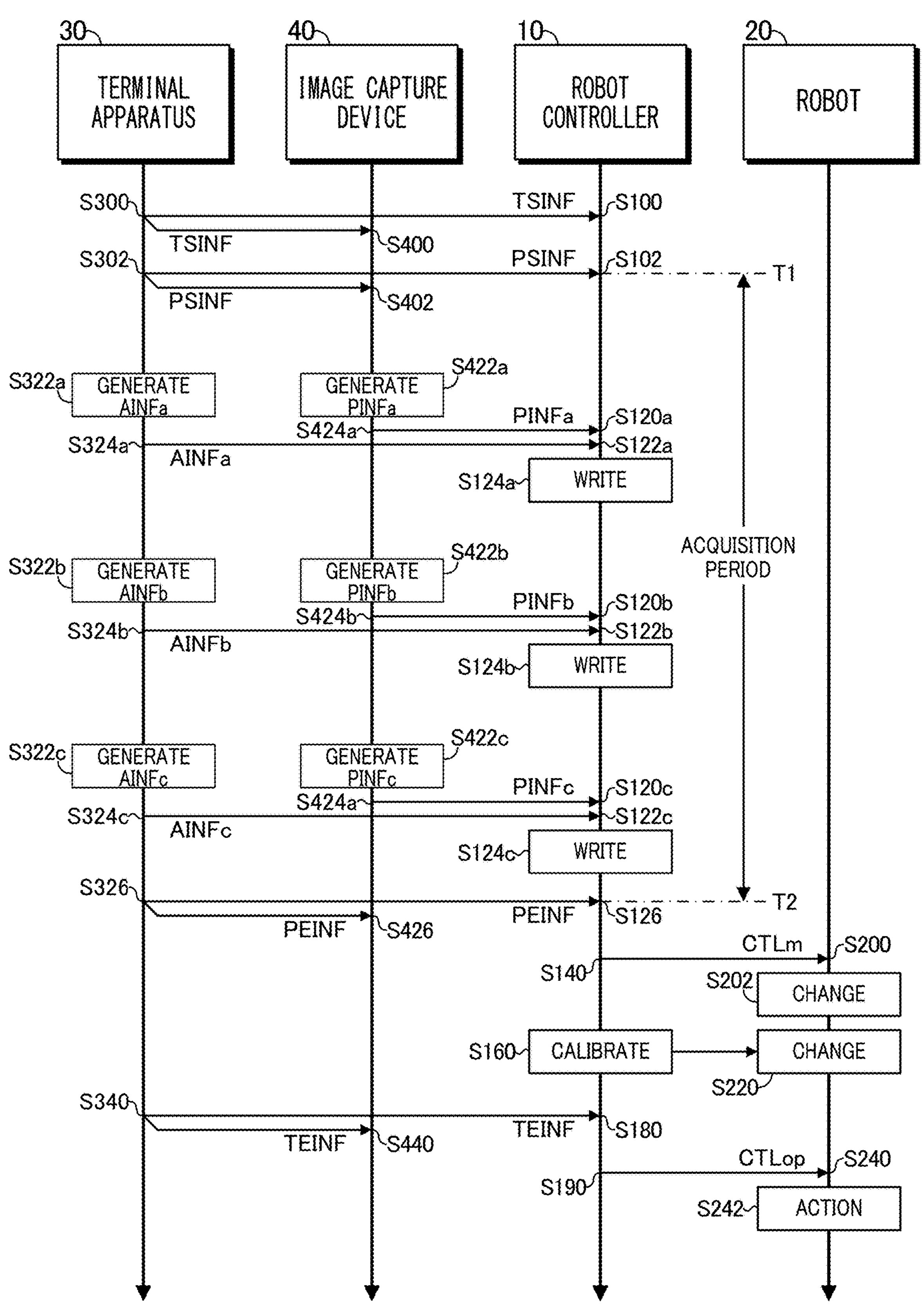
FIG. 10 is an explanatory sequence chart showing procedures for a robot system according to a first modification.

FIG. 10 is an explanatory sequence chart showing procedures for the robot system 1 according to the first modification. The same description of the procedures shown in FIG. 6 will be omitted. In FIG. 10, during an acquisition period in which a start timing T1 and an end timing T2 are designated by the operator U, the robot controller 10 (the information acquisition section 121) repeats an acquisition of the position information PINF and the orientation information AINF.

In FIG. 10, it is envisaged that instructions to start and end the acquisition period are provided by the operator U with the input device 35 of the terminal apparatus 30. In one example, if the input device 35 includes a send button, the acquisition period may begin in response to a press of the send button, and it may end in response to a release of the pressed send button. In this case, the period in which the send button is being pressed corresponds to the acquisition period. If the input device 35 includes a start button and an end button, the acquisition period may start in response to a press of the start button, and it may end in response to a press of the end button.

In FIG. 10, in a manner similar to that in FIG. 6, steps S120 through S124, steps S322 through S324, and steps S422 through S424 are each appended with a lower case letter (a, b, or c) followed by the steps to distinguish from other repeated steps. Similarly, the position information PINF and orientation information AINF are each appended with a lower case letter (a, b, or c) followed by the steps.

First, in response to a receipt of instructions to start the robot teaching, the terminal apparatus 30 transmits teaching initiate information TSINF to the robot controller 10 and the image capture device (detector) 40 (S300). Thereafter, the robot controller 10 and the image capture device 40 receive the teaching initiate information TSINF (S100 and S400).

Next, in response to a receipt of instructions to start the acquisition period, the terminal apparatus 30 transmits to the robot controller 10 and the image capture device 40, initiate information PSINF indicating a start of the acquisition period (S302). Thereafter, the robot controller 10 and the image capture device 40 receive the initiate information PSINF (S102 and S402). The initiate information PSINF may be transmitted from the terminal apparatus 30 to the image capture device 40 via the robot controller 10. In response to a receipt of the initiate information PSINF, the robot controller 10 and the image capture device 40 detect a beginning of the acquisition period.

In the acquisition period, the terminal apparatus 30 repeats (i) step S322 for generating orientation information AINF indicating an orientation of the terminal apparatus 30, and (ii) step S324 for transmitting the generated orientation information AINF to the robot controller 10. Furthermore, the image capture device 40 repeats (i) step S422 for generating position information PINF indicating a position of the terminal apparatus 30, and (ii) step S424 for transmitting the generated position information PINF to the robot controller 10. The robot controller 10 then repeats (i) step 120 for acquiring the position information PINF, (ii) step 122 for acquiring orientation information AINF, and (iii) step 124 for writing the acquired position information PINF and orientation information AINF in the movement table MTBL.

Next, in response to a receipt of the end instructions, the terminal apparatus 30 transmits to the robot controller 10 and the image capture device 40, end information PEINF indicating an end of the acquisition period (S326). Thereafter, the robot controller 10 and the image capture device 40 receive the end information PEINF (S126 and S426). The end informational PEINF may be transmitted from the terminal apparatus 30 to the image capture device 40 via the robot controller 10. In response to a receipt of the end informational PEINF, the robot controller 10 and the image capture device 40 detect the end of the acquisition period.

The robot controller 10 outputs a drive signal CTLm to the robot 20 (S140). The drive signal CTLm is a signal to set positions and orientations of the end effector HP of the robot 20 to the positions and orientations registered in the movement table MTBL. Thereafter, the robot 20 receives the drive signal CTLm (S200*a*). The robot 20 then changes positions and orientations of the end effector HP based on the drive signal CTLm (S202).

Next, the robot controller 10 calibrates the positions and orientations registered in the movement table MTBL (S160). In one example, the positions and orientations of the end effector HP of the robot 20 are changed to the calibrated positions and orientations indicated by the calibration information (S220).

In response to a receipt of instructions to end the robot teaching, the terminal apparatus 30 transmits the teaching end information TEINF to the robot controller 10 and the image capture device 40 (S340). The robot controller 10 and the image capture device 40 receive the teaching end information TEINF (S180 and S440). Upon the receipt of the teaching end information TEINF, the robot teaching is ended.

After the end of the robot teaching, the robot controller 10 outputs to the robot 20, a drive signal CTLop for the robot 20 to implement an action (S190). The robot 20 implements the action based on the drive signal CTLop received from the robot controller 10 (S240 and S242).

Procedures for the robot system 1 are not limited to the example shown in FIG. 10. In one example, position and orientations registered in the movement table MTBL may be calibrated as required. Alternatively, the calibration thereof may be omitted. In the acquisition period, the position information PINF and the orientation information AINF may be acquired by the information acquisition section 121 at a predetermined cycle. Further alternatively, for every time the terminal apparatus 30 is moved by a predetermined distance after the transmission of the position information PINF, the next position information PINF and the instruction information TINF described in FIG. 6 may be transmitted by the terminal apparatus 30. In this case, a movement amount of the terminal apparatus 30 may be calculated based on a result of the detection by the inertial sensor 38.

An outline of procedure for the robot controller 10 according to the first modification will now be described with reference to FIG. 11.

Figure 11:
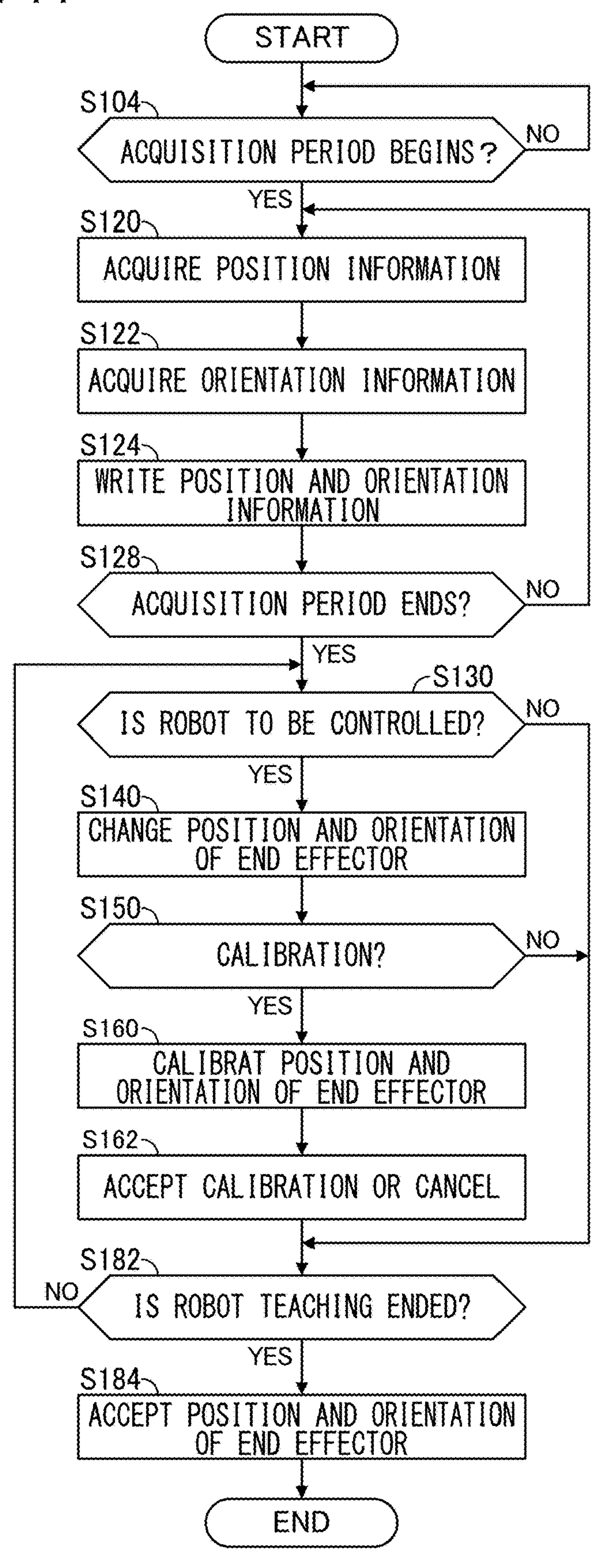
FIG. 11 is an explanatory flowchart of procedures for the robot controller according to the first modification.

FIG. 11 is an explanatory flowchart of procedures for the robot controller 10 according to the first modification. The procedures shown in FIG. 11 are identical to those shown in FIG. 9. However, the procedures differ in that it is determined if the robot 20 is to be controlled after an end of the acquisition period. The same description of the procedures shown in FIGS. 9 and 10 will be omitted. In one example, step S104 is executed after user instructions to start the robot teaching are received by the input device 35.

First, at step S104, the processor 12 acts as the information acquisition section 121 and detects a beginning of the acquisition period. Specifically, in response to a receipt of the initiate information PSINF by the communicator 14 of the robot controller 10, the information acquisition section 121 determines that the acquisition period has begun.

When a result of the determination at step S104 is affirmative, the processor 12 advances the processing to step S120. Otherwise, the processor 12 returns the processing to step S104.

Steps S120, S122 and S124 are identical to steps S120, S122 and S124 shown in FIG. 6, respectively. In one example, at steps S120, S122 and S124, the processor 12 acts as the information acquisition section 121. The processor 12 acquires the position information PINF and the orientation information AINF and then writes the acquired pieces of information (PINF and AINF) in the movement table MTBL. The processor 12 then advances the processing to step S128 after step S124.

At step S128, the processor 12 acts as the information acquisition section 121 and determines an end of the acquisition period. Specifically, in response to a receipt by the communicator 14 of the end information PEINF, the information acquisition section 121 determines that the acquisition period has been ended.

When a result of the determination at step S128 is affirmative, the processor 12 advances the processing to step S130. Otherwise, the processor 12 returns the processing to step S120.

Steps S130 through S184 are identical to steps S130 through S184 shown in FIG. 6, respectively. In one example, at steps S130, S140, S150, S160 and S182, the processor 12 acts as the movement control section 123. At steps S162 and S184, the processor 12 acts as the information generation section 122.

In one example, at step S130, the movement control section 123 determines if the robot 20 is to be controlled. When a result of the determination at step S130 is affirmative, the movement control section 123 changes a current position and the orientation of the end effector HP based on the position and the orientation registered in the movement table MTBL at the step S140. The processor 12 then advances the processing to step S150. Otherwise, the movement control section 123 determines an end of the robot teaching at step S182.

At step S150, the movement control section 123 determines if the position and orientation registered in the movement table MTBL are to be calibrated. When a result of the determination at step S150 is affirmative, the movement control section 123 calibrates the registered position and orientation at step S160 and then advances the processing to step S162. Otherwise, the movement control section 123 determines an end of the robot teaching at step S182.

At step S162, the information generation section 122 accepts the calibration executed at step S160 or cancels the calibration. After step S162, the movement control section 123 determines an end of the robot teaching at step S182.

When a result of the determination at step S182 is affirmative, the processor 12 advances the processing to step S184. Otherwise, the processor 12 returns the processing to step S130.

At step S184, the information generation section 122 accepts (uses) the position and orientation registered in the movement table MTBL as a target position and orientation of the end effector HP (i.e., movement information) and then generates movement information defining the target position and orientation. The accepted positions and orientations are listed in the order, thereby generating trajectory information on the robot 20. Each action of the robot 20 in accordance with the trajectory information is achieved by changing positions and orientations of the robot 20 (the end effector HP) in the order. It is noted that the calibration of the position and orientation at steps S130 through S182 (determination of whether the robot 20 is to be controlled) may be executed after generation of the trajectory information. Alternatively, the trajectory information may be generated from the calibrated position and orientation.

The procedures for the robot controller 10 are not limited to the example shown in FIG. 11. In one example, step S122 may be executed before step S120 or may be executed in conjunction with step S120.

This modification provides the same effects as the foregoing embodiment. In this modification, the information acquisition section 121 repeats an acquisition of the position information PINF and the orientation information AINF during the acquisition period, in which the start timing T1 and end timing T2 are designated by the operator U. As a result, even when many operating points of the robot 20 are required to be defined, an additional burden on the operator U can be reduced, and in addition, the position information PINF and the orientation information AINF can be acquired by the information acquisition section 121. Furthermore, in this modification, a path comprising positions of the end effector HP can be defined as a determined trajectory based on points indicated by pieces of position information PINF (e.g., a trajectory determined by interpolating more than one point). As a result, positions and orientations of the end effector HP can be changed from one to another smoothly.

(2) Second Modification

In the foregoing embodiment and modification, an inclination (orientation) of the terminal apparatus 30 is detected by the inertial sensor 38, and a position of the terminal apparatus 30 is detected by the image capture device (detector) 40. In this modified, an inclination (orientation) and position of the terminal apparatus 30 are detected by the inertial sensor 38 of the terminal apparatus 30. For this reason, the image capture device 40 is not necessarily required in this modification. The inertial sensor 38 according to this modification includes an acceleration sensor and an angular velocity sensor. The acceleration sensor detects an acceleration of the terminal apparatus 30 in each of the Xw, Yw and Zw axes in the three-dimensional space. The angular velocity sensor detects an angular velocity of the terminal apparatus 30 in each of the Xw, Yw and Zw axes. An inclination (orientation) of the terminal apparatus 30 is measured by the angular velocity sensor. In contrast, a movement distance of the terminal apparatus 30, which is sequentially moved from one position to another among two or more positions in the three-dimensional physical space, is detected by the acceleration sensor. In this modification, in a similar manner as for steps S130 through S182 (determination of whether the robot 20 is to be controlled) shown FIG. 9 according to the first embodiment, to teach the robot 20 actions, a position and orientation of the terminal apparatus 30 are calibrated at at least one position from among the positions to which the terminal apparatus 30 has moved. This calibration enables a relative distance of the terminal apparatus 30 to the robot 20 to be calculated from the movement distance of the terminal apparatus 30 detected by the acceleration sensor. Furthermore, as shown in the sequence chart of the first embodiment (see FIG. 6), pieces of position information PINF (see steps S422*a*, S422*b*, and S422*c*), which were generated by the image capture device 40, are generated by the terminal apparatus 30 and are transmitted to the robot controller 10. Steps other than these steps are identical to those of the first embodiment.

As described above, this modification provides the same effects as the embodiment. Furthermore, positions and orientations of the terminal apparatus 30 are detected using the inertial sensor 38 of the terminal apparatus 30, which requires no image capture device 40 and makes it easy to prepare a robot system. There is no need for images captured by the image capture device 40, increasing operability of the robot system. This is because the operator is no longer required to carefully look at orientations of the terminal apparatus 30 or a difficult area for capturing images that might be caused by obstacles, and the operator therefore can concentrate on operating the terminal apparatus 30.

In this modification, both the terminal apparatus 30 and the image capture device 40 shown in the first embodiment may be used to detect positions of the terminal apparatus 30. For positional detection used by the image capture device 40, in some cases, no markings MK can be detected due to obstacles or an angle of the terminal apparatus 30. In such a case, the positional detection can be implemented by use of the terminal apparatus 30 instead of the image capture device 40 (that is, the image capture device 40 is switched to the terminal apparatus 30). A movement distance between two positions, a position detected by the image capture device 40, and a position detected by the inertial sensor 38 of the terminal apparatus 30, is calculated, thereby identifying the position detected by the inertial sensor 38 of the terminal apparatus 30.

(3) Third Modification

In the foregoing embodiment and modifications, an example is given in which positional information PINF is generated by the image capture device (detector) 40. However, this disclosure is not limited to such an aspect. In one example, the position information PINF may be generated by the terminal apparatus 30. In this case, the information acquisition section 121 acquires position information PINF and orientation information AINF generated by the terminal apparatus 30.

Figure 12:
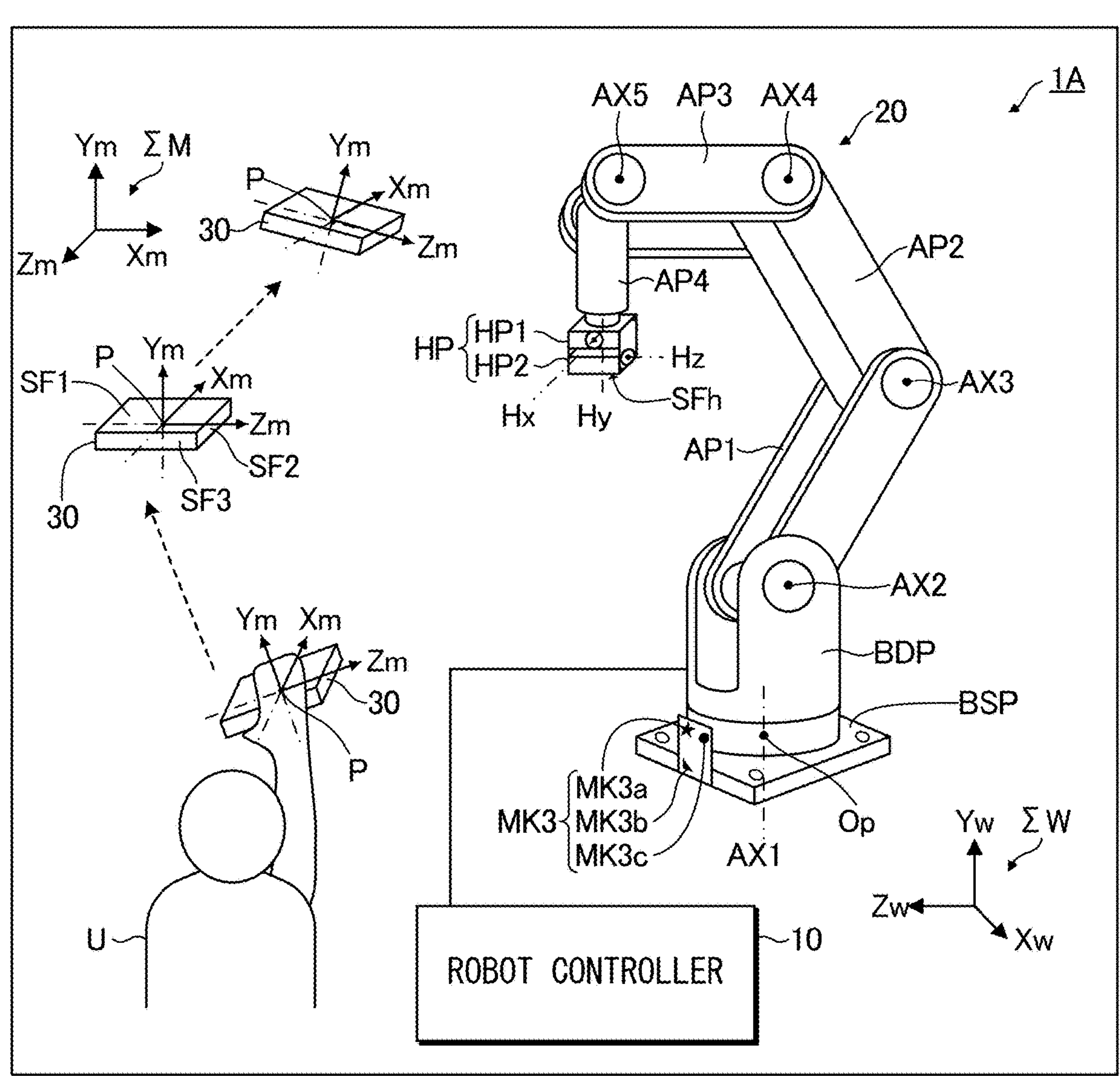
FIG. 12 is an explanatory diagram of an outline of a robotic system according to a third modification.

FIG. 12 is an explanatory diagram of an outline of a robotic system 1A according to the third modification. Elements identical to those described in FIGS. 1 through 11 are denoted by the same reference numerals, and detailed description thereof will be omitted.

The robot system 1A is similarly to the robot system 1 shown in FIG. 1 except the following (i) and (ii): (i) the image capture device 40 is omitted from the robot system 1, and (ii) three markings MK3 (MK3a, MK3b and MK3c) are provided on the robot 20 instead of the two markings MK1 and MK2. In this modification, for convenience of explanation, a mobile coordinate system ΣM fixed to the terminal apparatus 30 is introduced instead of the camera coordinate system ΣC.

The mobile coordinate system ΣM includes an origin at a predetermined position of the terminal apparatus 30. The mobile coordinate system ΣM is a three-axis orthogonal coordinate system with an Xm axis, a Ym axis and a Zm axis, which are perpendicular to one another. In this modification, it is envisaged that the Xm, Ym and Zm axes of the mobile coordinate system ΣM are identical to the Xm, Ym and Zm axes shown in FIG. 1, respectively. Furthermore, the Zm axis is parallel to an optical axis of the terminal apparatus 30 (in particular, the optical axis of an optical system of the image capture device 39).

Hereafter, it is further envisaged that a position of each of the markings MK3a, MK3b and MK3c is known in the world coordinate system ΣW. Positional relationships among the markings MK3a, MK3b and MK3c (i.e., orientations of the markings MK3) are also known. The markings MK3 may be provided on the robot 20 (the base portion BSP in an example of the embodiment shown in FIG. 12), or they may be provided in the vicinity of the robot 20.

A configuration of the terminal apparatus 30 is identical to that of the terminal apparatus 30 shown in FIGS. 4 and 5. The image capture device 39 included in the terminal apparatus 30 captures an image of the markings MK3 (MK3a, MK3b and MK3c). Each marking MK3 is disposed at a position with a known relative positional relationship between the marking and a predetermined position within the robot 20 (e.g., the position Op). The terminal apparatus 30 then calculates a position of the terminal apparatus 30 relative to the predetermined position by using the captured image of the markings MK3, to generate position information PINF indicating the calculated position.

An example will be described below in which a position of the terminal apparatus 30 is calculated using an images of the markings MK3 captured by the image capture device 39. However, a method for calculating the position thereof is not limited to the following examples.

In one example, vectors Va, Vb and Vc are given. The vector Va has an initial point set to the optical system of the image capture device 39, and a terminal point set to the marking MK3a. The vector Vb has an initial point set to the same optical system, and a terminal point set to the marking MK3b. The vector Vc has an initial point set to the same optical system, and a terminal point set to the marking MK3c.

Vectors Vab, Vac and Vbc are also given. The vector Vab has an initial point set to the marking MK3a, and a terminal point set to the marking MK3b. The vector Vac has an initial point set to the marking MK3a, and a terminal point set to the marking MK3c. The vector Vbc has an initial point set to the marking MK3b, and a terminal point set to the marking MK3c. In this definition, the vectors Va, Vb, Vc, Vab, Vac and Vbc satisfy relationships of Equations (1), (2) and (3) described below.

$$|Va - Vb| = |Vab| \tag{1}$$

$$|Va - Vc| = |Vac| \tag{2}$$

$$|Vb - Vc| = |Vbc| \tag{3}$$

Each of the vectors Vab, Vac and Vbc has a known length (|Vab|, |Vac| and |Vbc|) because each of the markings MK3a, MK3b and MK3c also has a known length in the world coordinate system ΣW.

In one example, the processor 32 of the terminal apparatus 30 acquires from the captured image of the markings MK3a, MK3b and MK3c, information indicating a direction of each of the vectors Va, Vb and Vc (specifically, two-dimensional information indicating a position of each marking MK3 on the captured image). Based on a focal length and the acquired vectors Va, Vb and Vc, the processor 32 calculates a length of each of the vectors Va, Vb and Vc shown in respective Equations (1), (2) and (3). The focal length is known and refers to a focal length of the optical system included in the image capture device 39.

Based on (i) the acquired direction of each the vectors Va, Vb and Vc and (ii) the calculated length of each of the vectors Va, Vb and Vc, the processor 32 calculates a position of each of the markings MK3a, MK3b and MK3c in the mobile coordinate system ΣM. In addition, based on (i) the known position of each of the markings MK3a, MK3b and MK3c in the world coordinate system ΣW, and (ii) the calculated position of each of the markings MK3a, MK3b and MK3c in the mobile coordinate system ΣM, the processor 32 calculates a position of the terminal apparatus 30 in the world coordinate system ΣW. The processor 32 then transmits position information PINF indicating the position of the terminal apparatus 30 in the world coordinate system ΣW to the robot controller 10.

A position of the terminal apparatus 30 in the world coordinate system ΣW may be calculated by the orientation detection section 324, or it may be executed by another functional block that differs from the orientation detection section 324. Specifically, the processor 32 may act as the other functional block and calculates a position of the terminal apparatus 30 in the world coordinate system ΣW.

To detect an orientation of the terminal apparatus 30, a position of each of the markings MK3a, MK3b and MK3c in the mobile coordinate system ΣM may be used instead of a result of the detection obtained by the inertial sensor 38. Specifically, the orientation detection section 324 may detect an orientation of the terminal apparatus 30 based on (i) the position of each of the markings MK3a, MK3b and MK3c in the world coordinate system ΣW, and (ii) the position of the each of the markings MK3a, MK3b and MK3c that in the mobile coordinate system ΣM. In this case, the terminal apparatus 30 does not necessarily include the inertial sensor 38.

Thus, in this modification, position information PINF and orientation information AINF are generated by the terminal apparatus 30. The information acquisition section 121 of the robot controller 10 acquires the generated position information PINF and the orientation information AINF from the terminal apparatus 30.

A configuration of the robot system 1A according to this modification is not limited to an example as shown in FIG. 12. In one example, each marking MK3 may be a QR code (registered trademark) or may be an LED. If the image capture device 39 is a three-dimensional camera, there may be one marking MK3.

This modification provides the same effects as those of the foregoing embodiment and modifications. Furthermore, in this modification, the terminal apparatus 30 includes an image capture device 39 that captures an image of the markings MK3. Each marking MK3 is disposed at a position with a known relative positional relationship between the marking and a predetermined position within the robot 20. The terminal apparatus 30 then calculates a position of the terminal apparatus 30 relative to the predetermined position by using the captured image of the markings MK3 by the image capture device 39, to generate position information PINF indicating the calculated position. The information acquisition section 121 of the robot controller 10 acquires the generated position information PINF. Thus, this modification requires the terminal apparatus 30, but does not require the image capture device 400. As a result, the size of a place for the robot system 1A can be reduced, and an arrangement of equipment including the robot 20 in the robot system 1A can be reduced in complexity.

(4) Fourth Modification

In the foregoing third modification, an example is given in which a position and orientation of the terminal apparatus 30 is identified by the terminal apparatus 30. However, this disclosure is not limited to such an aspect. In one example, one or both of the position and orientation of the terminal apparatus 30 may be identified by the robot controller 10. In this case, the information acquisition section 121 of the robot controller 10 may acquire from the terminal apparatus 30 the following (i) and (ii): (i) image information indicating an image of the markings MK3a, MK3b and MK3c captured by the image capture device 39, and (ii) information indicating the focal length of the image capture device 39. By using the same manner as for the third modification, the information generation section 122 of the robot controller 10 calculates a position of the terminal apparatus 30, using an image of the markings MK3 captured by the image capture device 39, to identify the position of the terminal apparatus 30.

If the robot controller 10 is configured to identify a position of the terminal apparatus 30 from the image information indicating an image of the markings MK3a, MK3b and MK3c, the image information corresponds to "position information." Similarly, if the robot controller 10 is configured to identify an orientation of the terminal apparatus 30 from the image information indicating the image of the marking MK3a, MK3b and MK3c, the image information corresponds to "orientation information." This modification also provides the same effects as those of the foregoing third modification.

(5) Fifth Modification

In the foregoing embodiment and the first modification, an example is given of orientation information AINF being generated by the terminal apparatus 30. However, this disclosure is not limited to such an aspect. In one example, the orientation information AINF may be generated by the image capture device (detector) 40 based on the image of the markings MK1 and MK2 captured by the image capture device 40. In this case, the information acquisition section 121 acquires the position information PINF and the orientation information AINF generated by the image capture device 40. Alternatively, in a manner similar to that of the fourth modification, one or both of the position and the orientation of the terminal apparatus 30 may be identified by the robot controller 10. In this case, the information acquisition section 121 of the robot controller 10 acquires from the image capture device 40 the following (i) and (ii): (i) image information indicating an image of the markings MK1 and MK2 captured by the image capture device 40, and (ii) information indicating a focal length of the image capture device 40. This modification also provides the same effects as those of the foregoing embodiment and first modification.

(6) Sixth Modification

In the foregoing embodiment and modifications, an example is given in which a portable information processing apparatus, such as the terminal apparatus 30, is employed as a "movable object." However, this disclosure is not limited to such an aspect. In one example, as long as the movable object includes the markings MK1 and MK2 and is movable by the operator U, a physical object other than the information processing apparatus may be employed as a "movable object." In such a case, the robot system 1 further includes a transmission instruction device that transmits to the image capture device (detector) 40, instruction information TINF indicating transmission of position information PINF, in response to a receipt of sending instructions. In one example, the operator U operates the transmission instruction device with one hand while holding with the other hand the movable object with the markings MK1 and MK2. A position and orientation of the movable object are identified based on an image of the markings MK1 and MK2 captured by the image capture device 40. The position and orientation thereof may be identified by the image capture device 40 or the robot controller 10. This modification provides the same effects as those of the foregoing embodiment and modifications.

(7) Seventh Modification

In the foregoing embodiment and modification, an example is given of generation of movement information defining a position and orientation of the end effector HP of the robot 20. However, this disclosure is not limited to such an aspect. In one example, the movement information may be defined by only a position of the end effector HP. In this case, the information acquisition section 121 acquires position information PINF indicating a position of the terminal apparatus 30. The information generation section 122 generates movement information defining a position of the end effector HP based on the received position information PINT. This modification provides the same effects as those of the foregoing embodiment and modifications.

As other matters in the foregoing embodiment and modifications, the operator U having the terminal apparatus 30 may teach the robot 20 actions at a position apart from a predetermined distance from the robot 20. In this case, the position of the terminal apparatus 30 indicated by the position information may be offset by the predetermined distance, thereby completing the robot teaching. Such a technique allows for the robot teaching without obstruction by the robot 20 as well as allows for more complicated robot teaching. In one example, the terminal apparatus 30 may be worn at the wrist of the operator U, and the robot teaching may be performed regularly. As a result, an automatic robot teaching can be achieved during the actual work. Additional independent work, that is, the "robot teaching," is no longer required. It is also possible to teach to the robot, intense and detailed actions (e.g., actions taken by a dancer).

DESCRIPTION OF REFERENCE SIGNS

1, 1A . . . robot system, 10 . . . robot controller, 12 . . . processor, 13 . . . memory, 14 . . . communicator, 15 . . . input device, 16 . . . display, 17 . . . drive circuit, 20 . . . robot, 30 . . . terminal apparatus, 32 . . . processor, 33 . . . memory, 34 . . . communicator, 35 . . . input device, 36 . . . display, 37 . . . loudspeaker, 38 . . . inertial sensor, 39 . . . image capture device, 40 . . . image capture device (detector), 120 . . . robot controller, 121 . . . information acquisition section, 122 . . . information generation section, 123 . . . movement control section, 124 . . . display control section, 125 . . . error notification section, 320 . . . terminal control section, 322 . . . operation notification section, 324 . . . orientation detection section, 326 . . . error notification control section, 328 . . . display control section, AINF . . . orientation information, CHS . . . input screen, HP . . . end effector, MTBL . . . movement table, and PINF . . . position information.

What is claimed is:

1. An information processing apparatus for robot teaching by using a movable object being moved independently in time from a robot, the information processing apparatus comprising:

at least one memory configured to store a program; and at least one processor configured to execute the program to at least:

based on the movable object being sequentially moved from one position to another among a plurality of positions in a physical space, acquire:

the plurality of positions of the movable object in the physical space, or the plurality of positions, and a plurality of orientations of the movable object at the plurality of respective positions in the physical space; and generate trajectory information indicating a trajectory of a specific part of the robot, the specific part moving to the same or substantially the same positions in the physical space at which the movable object was positioned, such that the specific part sequentially follows the plurality of positions in the physical space at which the moveable object was moved, by sequentially defining a plurality of positions and orientations of the specific part of the robot based on:

the acquired plurality of positions of the movable object, or the acquired plurality of positions and orientations of the movable object.

2. The information processing apparatus according to claim 1, wherein the at least one processor is further configured to execute the program to control the robot based on the generated trajectory information.

3. The information processing apparatus according to claim 2, further comprising an input device configured to receive calibration instructions to calibrate:

a position from among the acquired plurality of positions of the movable object, or the position, and an orientation from among the acquired plurality of orientations of movable object, wherein the at least one processor is further configured to execute the program to calibrate the generated trajectory information based on the calibration instructions.

4. The information processing apparatus of claim 1, wherein the trajectory information is generated in response to an end teaching event.

5. A robot system for robot teaching, comprising:

a robot;

a movable object that is sequentially movable from one position to another among a plurality of positions in a physical space and that is movable independently in time from the robot;

a detector configured to detect the plurality of positions of the movable object in the physical space; and an information processing apparatus, wherein the movable object comprises:

an inertial sensor configured to detect a plurality of orientations of the movable object at the plurality of respective positions in the physical space; and a communicator configured to communicate with at least the information processing apparatus, wherein the detector comprises a communicator configured to communicate with the information processing apparatus, and wherein the information processing apparatus comprises:

at least one memory configured to store a program; and at least one processor configured to execute the program to at least:

acquire from the detector, the detected plurality of positions of the movable object;

acquire from the inertial sensor, the detected plurality of orientations of the movable object;

generate trajectory information indicating a trajectory of a specific part of the robot, the specific part moving to the same or substantially the same positions in the physical space at which the movable object was positioned, such that the specific part follows the plurality of positions in the physical space at which the movable object was moved, by sequentially defining a plurality of positions and orientations of the specific part of the robot based on the acquired plurality of positions and the acquired plurality of orientations of the movable object; and control the robot based on the trajectory information.

6. The robot system according to claim 5, wherein the inertial sensor is further configured to detect a plurality of second positions of the movable object in the physical space, and the at least one processor is further configured to execute the program:

acquire, from the inertial sensor, the detected plurality of second positions of the movable object; and generate the trajectory information further based on:

the acquired plurality of positions;

the acquired plurality of orientations; and the acquired plurality of second positions.

7. The robot system according to claim 5, wherein the movable object or the information processing apparatus further comprises an input device configured to receive user instructions to cause the movable object or the information processing apparatus to detect:

the plurality of positions of the movable object, or the plurality of positions and orientations of the movable object.

8. A computer-implemented method for generating trajectory information indicative of a trajectory of a specific part of a robot in robot teaching by using a movable object, the method comprising:

based on the movable object being sequentially moved from one position to another among a plurality of positions in a physical space and being moved independently in time from the robot, acquiring:

the plurality of positions of the movable object in the physical space, or the plurality positions, and a plurality of orientations of the movable object at the plurality of respective positions in the physical space; and generating trajectory information indicating a trajectory of the specific part of the robot, the specific part moving to the same or substantially the same positions in the physical space at which the movable object was positioned, such that the specific part sequentially follows the plurality of positions in the physical space at which the moveable object was moved, by sequentially defining a plurality of positions and orientations of the specific part of the robot based on:

the acquired plurality of positions of the movable object, or the acquired plurality of positions and orientations of the movable object.

9. The method according to claim 8, further comprising:

moving the specific part of the robot to a position from among the plurality of the positions in the physical space;

calibrating the position of the moved specific part, and an orientation of the moved specific part at the position, and calibrating the generated trajectory information based on the calibrated position and orientation of the specific part.

10. The method according to claim 8, further comprising:

moving the specific part of the robot to a position from among the plurality of the positions in the physical space;

calibrating the position of the moved specific part, and an orientation of the moved specific part at the position, and generating the trajectory information based on the calibrated position and orientation of the specific part.

* * * * *